US011968506B1

(12) United States Patent
Zhang et al.

(10) Patent No.: US 11,968,506 B1
(45) Date of Patent: Apr. 23, 2024

(54) SPEAKERS

(71) Applicants: SHENZHEN SHOKZ CO., LTD., Guangdong (CN); KING TONE INNOVATION (BEIJING) TECHNOLOGY CO. LTD., Beijing (CN)

(72) Inventors: Lei Zhang, Shenzhen (CN); Shanyong Gu, Beijing (CN); Hongqiang Zhao, Beijing (CN); Peigeng Tong, Shenzhen (CN); Guolin Xie, Shenzhen (CN); Yongjian Li, Shenzhen (CN); Jiang Xu, Shenzhen (CN); Tao Zhao, Shenzhen (CN); Duoduo Wu, Shenzhen (CN); Ao Ji, Shenzhen (CN); Xin Qi, Shenzhen (CN)

(73) Assignees: SHENZHEN SHOKZ CO., LTD., Shenzhen (CN); KING TONE INNOVATION (BEIJING) TECHNOLOGY CO. LTD., Beijing (CN)

( * ) Notice: Subject to any disclaimer, the term of this patent is extended or adjusted under 35 U.S.C. 154(b) by 0 days.

(21) Appl. No.: 18/356,205

(22) Filed: Jul. 20, 2023

Related U.S. Application Data

(63) Continuation of application No. PCT/CN2023/083536, filed on Mar. 24, 2023.

(30) Foreign Application Priority Data

Oct. 28, 2022 (CN) ......................... 202211336918.4
Dec. 1, 2022 (CN) ......................... 202223239628.6
Dec. 30, 2022 (WO) ................ PCT/CN2022/144339

(51) Int. Cl.
*H04R 7/06* (2006.01)

(52) U.S. Cl.
CPC ...................................... *H04R 7/06* (2013.01)

(58) Field of Classification Search
CPC ............................................... H04R 7/12–127
See application file for complete search history.

(56) References Cited

U.S. PATENT DOCUMENTS

2007/0009133 A1 1/2007 Gerkinsmeyer
2018/0063637 A1 3/2018 Choi et al.
(Continued)

FOREIGN PATENT DOCUMENTS

CN 101031167 A 9/2007
CN 107277718 A 10/2017
(Continued)

OTHER PUBLICATIONS

English machine translation of KR 10-0783683 B1 (Han Man Dae; Micro Speaker; pubilshed Dec. 2007) (Year: 2007).*
(Continued)

*Primary Examiner* — Mark Fischer
(74) *Attorney, Agent, or Firm* — Metis IP LLC

(57) ABSTRACT

Embodiments of the present disclosure provide a speaker. The speaker may include a diaphragm; a magnetic circuit component; and a coil connected to the diaphragm, at least part of the coil being arranged in a magnetic gap formed by the magnetic circuit component, and the coil driving the diaphragm to vibrate to generate sound after the coil being energized. The diaphragm may include a main-body region and a folded-ring region surrounding the main-body region, the main-body region may include a first inclined section and a first connecting section connected to the coil, the first inclined section may be attached to a portion of the folded-ring region, and the first inclined section may be tilted in a direction away from the coil with respect to the first connecting section.

19 Claims, 18 Drawing Sheets

(56) References Cited

U.S. PATENT DOCUMENTS

| | | | |
|---|---|---|---|
| 2018/0376248 | A1 | 12/2018 | Yuen et al. |
| 2020/0196062 | A1 | 6/2020 | Zhang |
| 2021/0127209 | A1 | 4/2021 | Kim et al. |
| 2022/0343887 | A1 | 10/2022 | Xiao et al. |

FOREIGN PATENT DOCUMENTS

| | | | | | |
|---|---|---|---|---|---|
| CN | 207926857 | U | | 9/2018 | |
| CN | 111654789 | A | | 9/2020 | |
| CN | 111654790 | A | | 9/2020 | |
| CN | 112104955 | A | | 12/2020 | |
| CN | 212909891 | U | | 4/2021 | |
| CN | 113573215 | A | | 10/2021 | |
| CN | 114286228 | A | | 4/2022 | |
| CN | 216600066 | U | | 5/2022 | |
| CN | 114866925 | A | | 8/2022 | |
| CN | 114928800 | A | | 8/2022 | |
| CN | 115175069 | A | | 10/2022 | |
| EP | 1694092 | A1 | | 8/2006 | |
| KR | 100783683 | B1 | * | 12/2007 | ............... H04R 7/14 |
| WO | 2009104264 | A1 | | 8/2009 | |
| WO | 2022000917 | A1 | | 1/2022 | |

OTHER PUBLICATIONS

International Search Report in PCT/CN2023/083536 dated Jul. 10, 2023, 7 pages.
Written Opinion in PCT/CN2023/083536 dated Jul. 10, 2023, 7 pages.

* cited by examiner

100

SPEAKERS

CROSS-REFERENCE TO RELATED APPLICATIONS

This application is a continuation of International Application No. PCT/CN2023/083536, filed on Mar. 24, 2023, which claims priority to Chinese Patent Application No. 202211336918.4, filed on Oct. 28, 2022, Chinese Patent Application No. 202223239628.6, filed on Dec. 1, 2022, and International Application No. PCT/CN2022/144339, filed on Dec. 30, 2022, the entire contents of each of which are incorporated herein by reference.

TECHNICAL FIELD

The present disclosure relates to the field of acoustics, in particular, to speakers.

BACKGROUND

With the development of the acoustic output technology, speakers (e.g., headphones) have been widely used in people's daily lives. The speakers can be used in conjunction with electronic devices, such as mobile phones and computers, to provide users with an auditory enjoyment. An output performance of a speaker has a significant impact on the user's comfort. A structure of a diaphragm in the speaker and a supporting structure that matches the diaphragm usually affect the output performance of the speaker. Therefore, it is necessary to provide speakers with high output performance.

SUMMARY

An aspect of the present disclosure provides a speaker. The speaker may include a diaphragm; a magnetic circuit component; and a coil connected to the diaphragm. At least part of the coil may be arranged in a magnetic gap formed by the magnetic circuit component, and the coil driving the diaphragm to vibrate to generate sound after the coil being energized. The diaphragm may include a main-body region and a folded-ring region surround the main-body region, the main-body region may include a first inclined section and a first connecting section connected to the coil, the first inclined section may be attached to a portion of the folded-ring region, and the first inclined section may be tilted in a direction away from the coil with respect to the first connecting section.

In some embodiments, the folded-ring region may include a second inclined section, and at least part of the second inclined section is attached to the first inclined section.

In some embodiments, the second inclined section may be arranged on a side of the first inclined section away from the coil.

In some embodiments, the folded-ring region may include an arc-shaped section, and a ratio of a height of the arc-shaped section to a span of the arc-shaped section may be within a range of 0.35-0.4.

In some embodiments, an inclination angle of the first inclined section with respect to the first connecting section may be within a range of 5°~30°, and the first connecting section may be perpendicular to a vibration direction of the diaphragm.

In some embodiments, the main-body region may include a dome arranged at an end of the first connecting section far from the first inclined section, and a span of the dome may be within a range of 2 mm~8 mm, and a height of the dome may be within a range of 0.7 mm~1.2 mm.

In some embodiments, a ratio of the height of the dome to the span of the dome may be within a range of within a range of 0.1~0.3.

In some embodiments, a frequency of a high-frequency split vibration may be not less than 20 kHz.

In some embodiments, the magnetic circuit component may include an accommodation member, and a distance from a bottom of the coil to a bottom of the accommodation member may be within a range of 0.8 mm~0.9 mm in a frequency range of 20 Hz~6.1 kHz under an input voltage within 0.1V~0.7V.

In some embodiments, the speaker may further include a bracket arranged around the magnetic circuit component, and a first part of the bracket may be connected to a second connecting section of the folded-ring region.

In some embodiments, the second connecting section of the folded-ring region may be connected to the first part of the bracket via a fixed ring.

In some embodiments, a thickness of the first part of the bracket connected to the folded-ring region may be within a range of 0.3 mm~3 mm, and the thickness of the first part may be a minimum distance between a connection region of the bracket and the folded-ring region and an attaching region of the bracket directly attaching to the magnetic circuit component in a vibration direction of the diaphragm.

In some embodiments, the speaker may further include a housing, wherein a pressure relief hole may be provided on the housing, and a rear cavity with a resonant frequency being not less than 3.3 kHz may be formed between the pressure relief hole and a back surface of the diaphragm.

In some embodiments, a volume of the rear cavity may be within a range of 60 $mm^3$~110 $mm^3$.

In some embodiments, the speaker may further include a housing, wherein a pressure relief hole may be provided on the housing, a plurality of air holes may be provided on the bracket, sound from a back surface of the diaphragm may be transmitted to the pressure relief hole via the plurality of air holes, the plurality of air holes at least may include a first air hole and a second air hole, a distance from a center of the first air hole to a center of the pressure relief hole may be greater than a distance from a center of the second air hole to the center of the pressure relief hole, and an area of the first air hole may be greater than an area of the second air hole.

In some embodiments, the speaker may further include a housing, wherein a pressure relief hole may be provided on the housing, a plurality of air holes may be provided on the bracket, sound from a back surface of the diaphragm may be transmitted to the pressure relief hole via the plurality of air holes, and a ratio of a total area of the plurality of air holes to an area of a projection of the diaphragm in a vibration direction of diaphragm may be within a range of 0.008~0.3.

In some embodiments, the area of the projection of the diaphragm in the vibration direction of diaphragm is within a range of 90 $mm^2$~560 $mm^2$, and the total area of the plurality of air holes is within a range of 4.54 $mm^2$~12.96 $mm^2$.

In some embodiments, the speaker may further include a housing, wherein a ratio of an area of a projection of the diaphragm in a vibration direction of diaphragm to an area of a projection of the housing in the vibration direction of diaphragm may be not less than 0.5.

In some embodiments, the ratio of the area of the projection of the diaphragm in the vibration direction of diaphragm to the area of the projection of the housing in the vibration direction of diaphragm may be within a range of 0.8~0.95.

In some embodiments, a size of a long axis of the diaphragm may be within a range of 13 mm~25 mm, and a size of a short axis of the diaphragm may be within a range of 4 mm~13 mm.

In some embodiments, a plurality of air holes may be provided on a bottom wall of an accommodation member of the magnetic circuit component or a side wall of the magnetic circuit component that may be attached to the bracket.

In some embodiments, the dome may be formed by carbon fibers arranged in an interlacing arrangement, at least a portion of the carbon fibers may be interlaced at a first angle, and the first angle is within a range of 45°~90°.

In some embodiments, a thickness of the dome may be less than 80 um in a vibration direction of the diaphragm.

In some embodiments, a minimum distance between the coil and the first inclined section may be not less than 0.3 mm.

In some embodiments, the magnetic circuit component may include a magnetic conductive plate and a magnet, wherein the magnetic conductive plate may be arranged between the magnet and the diaphragm and may be attached to a surface of the magnet, and a distance between a center of the coil and a center of the magnetic conductive plate may be less than 0.3 mm in a vibration direction of the diaphragm.

In some embodiments, a distance from a lowest point of the dome to an upper surface of the magnetic conductive plate may be greater than 0.8 mm in a vibration direction of the diaphragm.

In some embodiments, the magnetic circuit component may include an accommodation member, and a distance between a bottom wall of the coil and a bottom of the accommodation member may be within a range of 0.2 mm~4 mm in a vibration direction of the diaphragm.

In some embodiments, a distance between the coil and a side wall of the accommodation member may be within a range of 0.1 mm~0.5 mm.

BRIEF DESCRIPTION OF THE DRAWINGS

The present disclosure is further illustrated in terms of exemplary embodiments, and these exemplary embodiments are described in detail with reference to the drawings. These embodiments are not restrictive. In these embodiments, the same number indicates the same structure, wherein.

DETAILED DESCRIPTION

Figure 1:
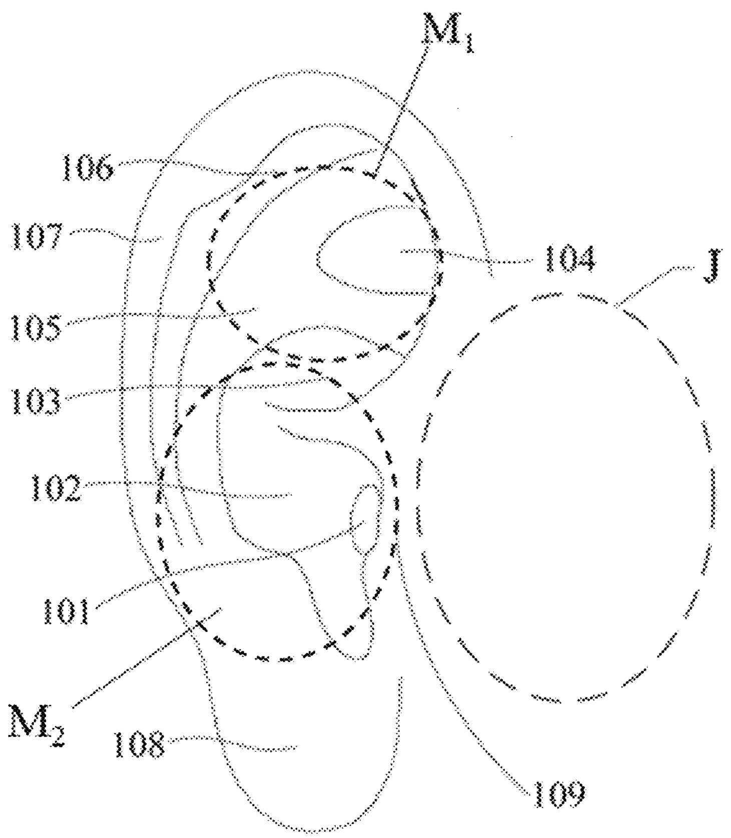
FIG. 1 is a schematic diagram illustrating an exemplary ear according to some embodiments of the present disclosure.

In order to illustrate the technical solutions related to the embodiments of the present disclosure, a brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

It will be understood that the terms "system," "device," "unit," and/or "module" used herein are one method to distinguish different components, elements, parts, sections, or assemblies of different levels in ascending order. However, the terms may be displaced by other expressions if they may achieve the same purpose.

As shown in the present disclosure and claims, unless the context clearly indicates exceptions, the words "a," "an," "one," and/or "the" do not specifically refer to the singular, but may also include the plural. The terms "including" and "comprising" only suggest that the steps and elements that have been clearly identified are included, and these steps and elements do not constitute an exclusive list, and the method or device may also include other steps or elements.

In the description of the present disclosure, it should be understood that the terms “first”, “second”, “third”, “fourth”, etc. are merely used for illustration and cannot be understood as indicating or implying relative importance or implying the quantity of technical features indicated. Therefore, features limited to “first”, “second”, “third”, and “fourth” can explicitly or implicitly include at least one of these features. In the description of the present disclosure, “a plurality of” means at least two, such as two, three, etc., unless otherwise specified.

In the present disclosure, unless otherwise specified and limited, the terms “connected”, “fixed”, and other terms should be understood broadly. For example, the term “connection” refers to a fixed connection, a detachable connection, or an integral part. The term “connection” also can be a mechanical connection or an electrical connection, can be directly connected or indirectly connected through an intermediate medium, or can be the internal connection between two components or the interaction relationship between two components, unless otherwise specified. For those having ordinary skills in the art, the specific meanings of the above terms in the present disclosure can be understood based on specific circumstances.

The flowcharts used in the present disclosure may illustrate operations executed by the system according to embodiments in the present disclosure. It should be understood that a previous operation or a subsequent operation of the flowcharts may not be accurately implemented in order. Conversely, various operations may be performed in inverted order, or simultaneously. Moreover, other operations may be added to the flowcharts, and one or more operations may be removed from the flowcharts.

FIG. 1 is a schematic diagram illustrating an exemplary ear according to some embodiments of the present disclosure. As shown in FIG. 1, the ear 100 may include an external auditory meatus 101, a cavity of auricular concha 102, a cymba of auricular concha 103, a triangular fossa 104, an anthelix 105, a scapha 106, a helix 107, an earlobe 108, and a crus of helix. In some embodiments, the wearing and stabilization of an acoustic device may be achieved through one or more parts of the ear 100. In some embodiments, the external auditory meatus 101, the cavity of auricular concha 102, the cymba of auricular concha 103, the triangular fossa 104, and other parts have a certain depth and volume in a three-dimensional (3D) space, which may be used to meet the wearing requirements of the acoustic device. For example, the acoustic device (e.g., in-ear headphones) may be worn in the external auditory meatus 101. In some embodiments, the wearing of the acoustic device may be achieved by utilizing other parts of the ear 100 except for the external auditory meatus 101. For example, the acoustic device may be worn using a part of the ear 100 such as the cymba of auricular concha 103, the triangular fossa 104, the anthelix 105, the scapha 106, the helix 107, or a combination thereof. In some embodiments, in order to improve the comfort and reliability of the acoustic device in wearing, parts of the ear 100 such as the earlobe 108 of a user may also be used. By utilizing other parts of the ear 100 except for the external auditory meatus 101, the wearing of the acoustic device and the transmission of sound may be achieved, which may “liberate” the external auditory meatus 101 of the user and reduce the impact of the acoustic device on the ear health. When the user wears the acoustic device on a road, the acoustic device may not block the external auditory meatus 101. Thus, the user may receive both sound from the acoustic device and sound from the environment (e.g., whistle, car bell, surrounding people, traffic command sound, etc.), thereby reducing the probability of traffic accidents. For example, when the user wears an acoustic device, the overall or a portion of structures of the acoustic device may be arranged on a front side of the crus of helix 109 (e.g., a region J enclosed by dashed lines shown in FIG. 1). For example, when the user wears the acoustic device, the overall or a portion of structures of the acoustic device may contact with an upper part of the external auditory meatus 101 (e.g., positions of one or more parts such as the crus of helix 109, the cymba of auricular concha 103, triangular fossa 104, the anthelix 105, the scapha 106, the helix 107, etc.). For example, when the user wears the acoustic device, the overall or a portion of structures of the acoustic device may be arranged within one or more parts (e.g., the cavity of auricular concha 102, the cymba of auricular concha 103, triangular fossa 104, etc.) of the ear (e.g., regions M1 and M2 enclosed by dashed lines in FIG. 1).

Different users may have individual differences, resulting in differences in shapes, sizes, and other dimensions of ears of the different users. For the convenience of description and understanding, unless otherwise specified, an ear model used in the present disclosure is referred with a “standard” shape and size, and further used to describe the wearing methods of acoustic devices in different embodiments on the ear model. For example, a simulator including a head and (left and right) ears obtained based on standards of ANSI: S3.36, S3.25, and IEC: 60318-7, such as GRAS KEMAR, HEAD Acoustics, B&K 4128 series, or B&K 5128 series, may be used as reference for wearing the acoustic device, thus presenting a scenario where most users normally wear the acoustic device. Taking a GRAS KEMAR as an example, the ear simulator may be any of GRAS 45AC, GRAS 45BC, GRAS 45CC, or GRAS 43AG. Taking HEAD Acoustics as an example, the ear simulator may be any of HMS 11.3, HMS 11.3 LN, or HMS II.3LN HEC. It should be noted that ranges of data measured in the embodiments of the present disclosure are acquired from the GRAS 45BC KEMAR. However, it should be understood that there may be differences between different head models and ear models, and there may be ±10% fluctuations in ranges of relevant data when using other models. Merely by way of example, the ear as a reference may have the following features: a size of a projection of an auricle of the ear on a sagittal plane in a direction of a vertical axis may be within a range of 49.5 mm~74.3 mm, and a size of a projection of the auricle of the ear on a sagittal plane in a direction of a sagittal axis may be within a range of 36.6 mm~55 mm. The projection of the auricle on the sagittal plane refers to a projection of an edge of the auricle on the sagittal plane. The edge of the auricle may be composed of at least an outer contour of a helix, a contour of an earlobe, a contour of a tragus, an intertragal notch, an apex of antitragus, a helix tragus notch, etc. Therefore, in the present disclosure, descriptions such as “user is wearing”, “in a wearing state”, and “under a wearing state” refer to the acoustic device described in the present disclosure being worn on the ear of the ear simulator. Considering the individual differences among different users, structures, shapes, sizes, thickness, etc., of one or more parts of the ear 100 may be differentiated according to different shapes and sizes of the ear. These differentiated designs may be manifested as feature parameters of one or more parts of the acoustic device (e.g., speaker, an ear hook, etc., in the following description) within different ranges of values to adapt to different ears of the different users.

It should be noted that in the fields of medicine and anatomy, three basic sections including a sagittal plane, a coronal plane, and a horizontal plane of the human body, and three basic axes including a sagittal axis, a coronal axis, and a vertical axis of the human body are defined. The sagittal plane refers to a plane perpendicular to the ground and made along a front-rear direction of the body, which divides the body into left and right parts. The coronal plane refers to a plane perpendicular to the ground and made along a left-right direction of the body, which divides the body into a front part and a back part. The horizontal plane refers to a plane parallel to the ground and made alone an up-down direction perpendicular to the body, which divides the body into an upper part and a lower part. Accordingly, the sagittal axis refers to an axis along the front-rear direction of the body and perpendicular to the coronal plane, the coronal axis refers to an axis along the left-right direction of the body and perpendicular to the sagittal plane, and the vertical axis refers to an axis along the upper-lower direction of the body and perpendicular to the horizontal plane. Furthermore, an "anterior side of the ear" described in the present disclosure refers to a side along the sagittal axis and arranged on the ear towards a facial region of the human body. Observing the ear of the ear simulator along a direction of the coronal axis may obtain the schematic diagram of the anterior contour of the ear shown in FIG. 1.

The description of the ear 100 mentioned above is merely for illustrative purposes and is not intended to limit the scope of the present disclosure. For those of ordinary skills in the art, various changes and modifications may be made based on the description of the present disclosure. For example, a portion of structures of the acoustic device may block a portion or all of the external auditory meatus 101. These changes and modifications are still within the scope of the present disclosure.

Figure 2:
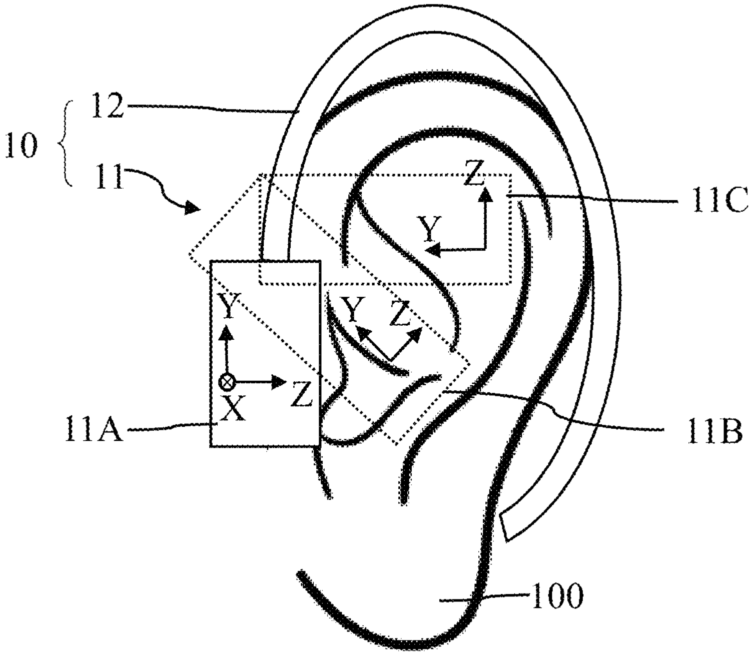
FIG. 2 is a schematic diagram illustrating a scene of wearing an open headphone according to some embodiments of the present disclosure.
Figure 3:
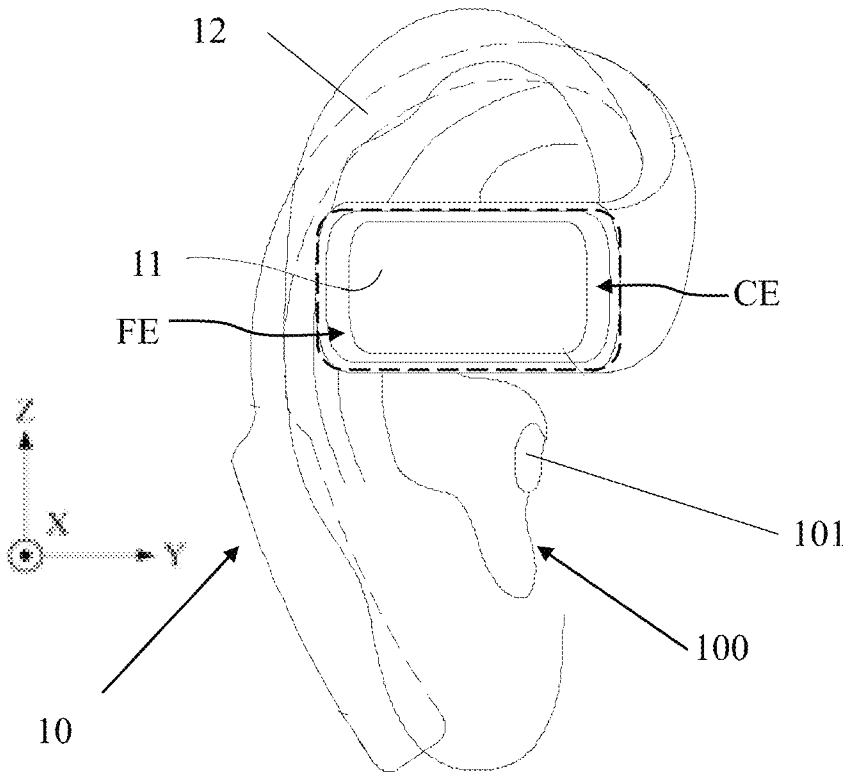
FIG. 3 is another schematic diagram illustrating a scene of wearing an open headphone according to some embodiments of the present disclosure.
Figure 4:
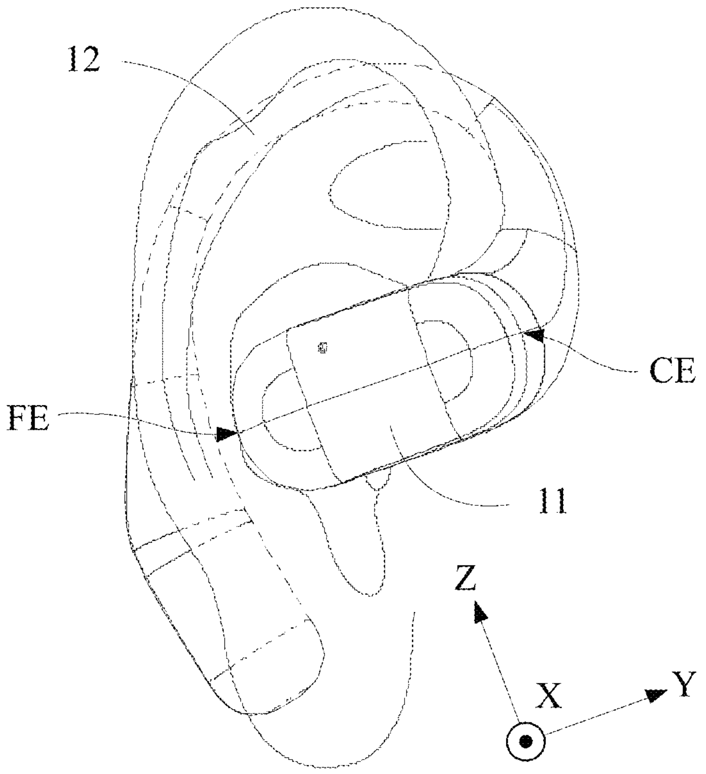
FIG. 4 is a schematic diagram illustrating a scene of wearing another open headphone according to some embodiments of the present disclosure.

FIG. 2 is another schematic diagram illustrating a scene of wearing an open headphone according to some embodiments of the present disclosure. FIG. 3 is another schematic diagram illustrating a scene of wearing an open headphone according to some embodiments of the present disclosure. FIG. 4 is a schematic diagram illustrating a scene of wearing another open headphone according to some embodiments of the present disclosure. In some embodiments, an open headphone 10 may include, but may not be limited to, an air-conduction headphone and a bone air conduction headphone. In some embodiments, the open headphone 10 may be combined with a product such as glasses, headphones, a head-mounted display device, a AR/VR helmet, etc. As shown in FIGS. 2-4, an open headphone 10 may include a speaker 11 and an ear hook 12. In some embodiments, the open headphone 10 may be worn on a user's body (e.g., the head, neck, or upper torso of the human body) via the ear hook 12.

In some embodiments, when the open headphone 10 is in a wearing state, a first part of the ear hook 12 may be hung between the auricle and head of the user, and a second part of the ear hook may extend towards a side of the auricle away from the head and connect to the speaker 11. The second part of the ear hook 12 may be used to fix the speaker 11 near an acoustic meatus, but may not block the acoustic meatus. In some embodiments, the ear hook 12 may be an arc structure that is adapted to the user's auricle, so that the ear hook 12 may be suspended at an upper auricle of the user. In some embodiments, the ear hook 12 may also be a clamping structure that is adapted to the user's auricle, so that the ear hook 12 may be clamped at the user's auricle. In some embodiments, the ear hook 12 may include, but may not be limited to, a hook structure, an elastic band, etc., allowing the open headphone 10 to be well fixed to the user and preventing the ear hook from falling during use.

In some embodiments, the speaker 11 may be worn on the user's body, and a transducer (e.g., a transducer 112) may be provided within the speaker 11 to generate sound for inputting into the ear 100 of the user. In some embodiments, the open headphone 10 may be combined with a product such as glasses, headphones, a head-mounted display devices, AR/VR helmet, etc. In this case, the speaker 11 may be hung or clamped near the ear 100 of the user. In some embodiments, the speaker 11 may be circular, elliptical, polygonal (regular or irregular), U-shaped, V-shaped, or semicircular, so that the speaker 11 may be directly hung on the ear 100 of the user.

In combination with FIG. 1 and FIG. 2, in some embodiments, when the user wears the open headphone 10, at least a portion of the speaker 11 may be located in a region J on the front of the tragus of the ear 100 shown in FIG. 1, or location in the regions M1 and M2 within the earlobe. An exemplary explanation in conjunction with the different wearing positions (11A, 11B, and 11C shown in FIG. 2) of the speaker 11 may be described in the following description. It should be noted that a front outer side of the auricle mentioned in the embodiments of the present disclosure refers to a side of the auricle away from the head along the coronal axis, and correspondingly, a rear inner side of the auricle refers to a side of the auricle that faces the head along the coronal axis. In some embodiments, the speaker 11 may be located on a side of the ear 100 facing a facial region of the human body along the sagittal axis, i.e., the speaker 11 may be located in the region J in front of the ear 100.

Furthermore, the transducer (e.g., a transducer 112) may be arranged inside a housing of the speaker 11, and at least one sound outlet hole (e.g., a sound outlet hole 111*a*, not shown in FIG. 2) may be arranged on the housing of the speaker 11. The sound outlet hole may be located on a side wall of the housing of the speaker facing or near the external acoustic meatus 101 of the user, and the transducer may output sound to the external acoustic meatus 101 via the sound outlet hole. The transducer may be a component that can receive an electrical signal and convert the electrical signal into a sound signal for output. In some embodiments, differentiated by frequency, a type of the transducer 112 may include a low-frequency (e.g., 30 Hz-150 Hz) speaker, a mid-low frequency (e.g., 150 Hz-500 Hz) speaker, a mid-high frequency (e.g., 500 Hz-5 kHz) speaker, a high-frequency (e.g., 5 kHz-16 kHz) speaker, or full frequency (e.g., 30 Hz-16 kHz) speaker, or any combination thereof. The low frequency, high frequency, etc., mentioned here only represent an approximate range of frequencies, which may be divided with different ways in different application scenarios. For example, a frequency division point may be determined. Low frequencies represent frequencies lower than a frequency at the frequency division point, and high frequencies represent frequencies higher than the frequency at the frequency division point. The frequency at the frequency division point may be any value within an audible range of a human ear, such as 500 Hz, 600 Hz, 700 Hz, 800 Hz, 1000 Hz, etc.

In some embodiments, the transducer may include a diaphragm (e.g., a diaphragm 1121). When the diaphragm vibrates, sound may be emitted from a front side and a rear side of the diaphragm, respectively. A cavity inside the housing of the speaker 11 may be divided by the diaphragm into at least a front cavity (e.g., a front cavity 114) arranged on the front side of the diaphragm and a rear cavity (e.g., a rear cavity 116) arranged on the rear side of the diaphragm.

The sound outlet hole may be acoustically coupled with the front cavity, and a vibration of the diaphragm may drive air in the front cavity to vibrate to generate air-conducted sound. The air-conducted sound generated in the front cavity may be transmitted to external environment via the sound outlet hole. In some embodiments, the housing of the speaker 11 may be provided with one or more pressure relief holes (e.g., a first pressure relief hole 111*c* and a second pressure relief hole 111*d*), and the one or more pressure relief holes may be arranged on a side wall adjacent to or opposite to a side wall where the sound outlet hole is arranged on the housing. The one or more pressure relief holes may be acoustically coupled with the rear cavity, and the vibration of the diaphragm may also drive the air in the rear cavity to vibrate to generate air-conducted sound. The air-conducted sound generated in the rear cavity may be transmitted to the external environment via the one or more pressure relief holes. For example, in some embodiments, the transducer inside the speaker 11 may output sound with phase differences (e.g., opposite phases) via the sound outlet hole and the one or more pressure relief hole. The sound outlet hole may be arranged on the side wall of the housing of the speaker 11 facing the external acoustic meatus 101, and the one or more pressure relief holes may be arranged on a side of the housing of the speaker 11 away from the external acoustic meatus 101. At this time, the housing may act as a baffle, to increase a sound path difference from the sound outlet hole and one or more pressure relief hole to the external acoustic meatus 101 to increase the sound intensity at the external acoustic meatus 101, while reducing the far-field leakage volume.

In some embodiments, a long axis direction Y and a short axis direction Z may be reflected on the speaker 11. The long axis direction Y and the short axis direction Z may both be perpendicular to a thickness direction X of the speaker 11, and may be orthogonal to each other. The long axis direction Y may be defined as a direction with the largest extension size (e.g., when a shape of a projection is a rectangle or an approximate rectangle, the long axis direction is a length direction of the rectangle or the approximate rectangle) in a shape of a two-dimensional (2D) projection (e.g., a projection of the speaker 11 on a plane where an outer surface of the speaker is located, or a projection of the speaker 11 on the sagittal plane) of the speaker 11. The short axis direction Z may be defined as a direction perpendicular to the long axis direction Y in a shape of a projection of the speaker 11 on the sagittal plane (e.g., when the shape of the projection of the speaker 11 is a rectangle or an approximate rectangle, the short axis direction is a width direction of the rectangle or an approximate rectangle). The thickness direction X may be defined as a direction perpendicular to a plane of the 2D projection, for example, the thickness direction may be consistent with a direction of the coronal axis, both pointing to the left-right direction of the body. In some embodiments, when the speaker 11 is inclined in the wearing state, the long axis direction Y and the short axis direction Z may be still parallel or nearly parallel to the sagittal plane, a certain included angle may exist between the long axis direction Y and the direction of the sagittal axis, that is, the long axis direction Y may also be inclined. A certain included angle may also exist between the short axis direction Z and the direction of the vertical axis, that is, the short axis direction Z may also be inclined, which is shown in scene of wearing the speaker 11 on 11B in FIG. 2 and the scene of wearing the speaker 11 in FIG. 4. In some embodiments, the overall or a portion of structures of the speaker 11 may extend into the cavity of auricular concha, that is, the projection of the speaker 11 on the sagittal plane may overlap a projection of the cavity of auricular concha on the sagittal plane. More description of wearing the speaker 11 on 11B may be found elsewhere in the present disclosure, for example, FIG. 3 and the relevant description. In some embodiments, the speaker 11 may also be horizontal or approximately horizontal in the wearing state. As shown in scene of wearing the speaker 11 on 11C in FIG. 2 and the speaker 11 as shown in FIG. 3 at 11C, the long axis direction Y may be consistent or approximately consistent with the direction of the sagittal axis, both pointing in the front-rear direction of the body, and the short axis direction Z may be consistent or approximately consistent with the direction of the vertical axis, both pointing in the up-down direction of the body. It should be noted that in the wearing state, the speaker 11 being approximately horizontal refers to that an angle between the long axis direction of the speaker 11 and the sagittal axis shown in FIG. 2 being within a certain range (e.g., the angle being not greater than 20°). In addition, a wearing position of the speaker 11 may not limited to the 11A, 11B, and 11C shown in FIG. 2, that is, a position meets a range requirement within the regions J, M1, or M2 shown in FIG. 1 may be the wearing position. For example, the overall or a portion of structures of the speaker 11 are located in the area J enclosed by the dashed line in FIG. 1. For example, the overall or a portion of structures of the speaker 11 contact with one or more parts of and the crus of helix 109 of the external acoustic meatus 101, the cymba of auricular concha 103, the triangular fossa 104, the anthelix 105, the scapha 106, and the helix 107. For example, the overall or a portion of structures of the speaker 11 may be located within a cavity (e.g., the region M1 containing at least the cymba of auricular concha 103, the triangular fossa 104, and the region M2 containing at least the cavity of auricular concha 102 enclosed by the dashed line in FIG. 1) formed by one or more parts (e.g., the cavity of auricular concha 102, the cymba of auricular concha 103, the triangular fossa 104, etc.) of the ear 100.

In some embodiments, in order to improve the stability of the open headphone 10 in the wearing state, the open headphone 10 may adopt any one or a combination of the following methods. For example, at least a portion of the ear hook 12 is arranged as a contour structure that fits with at least one of a rear side of the ear and the head to increase a contact area between the ear hook 12 and the ear and/or head, thereby increasing the resistance of the open headphone 10 to detach from the ear. For example, at least a portion of the ear hook 12 is arranged as an elastic structure, thus a certain strain of the ear hook in the wearing state may increase a positive pressure of the ear hook 12 on the ear and/or head, thereby increasing the resistance of the open headphone 10 to detach from the ear. For example, at least a portion of the ear hook 12 is arranged to rest against the head in the wearing state, forming a reaction force that presses against the ear, causing the speaker 11 to press against a front side of the ear, thereby increasing the resistance of the open headphone 10 to detach from the ear. For example, the speaker 11 and the ear hook 12 are arranged to grip physiological parts such as regions where the helix and the cavity of auricular concha are located from the front side and the rear side of the ear when wearing the open headphone 10, thereby increasing the resistance of the open headphone 10 to detach from the ear. For example, at least a portion of the speaker 11 or an auxiliary structure connected to the speaker 11 is arranged to extend into physiological parts such as the cavity of auricular concha, cymba of auricular concha, triangular fossa, and concha, thereby increasing the resistance of the open headphone 10 to detach from the ear.

The speaker 11 may include a connecting end CE being connected to the ear hook 12, and a free end FE being not connected to the ear hook 12. For example, in combination with FIG. 4, in the wearing state, the free end FE of the speaker 11 may extend into the cavity of auricular concha. Optionally, the speaker 11 and ear hook 12 may be arranged to jointly grip the one or more parts of the ear corresponding to the cavity of auricular concha from the front side and the rear side of the ear, thereby increasing the resistance of the open headphone 10 to detach from the ear, and improving the stability of the open headphone 10 in the wearing state. For example, the free end FE of the speaker 11 is pressed in the cavity of auricular concha in the thickness direction X. For example, the free end FE is attached to the cavity of auricular concha in the long axis direction Y and/or the short axis direction Z (e.g., cavity of auricular concha is attached to an inner wall of a free end FE of the cavity of auricular concha). The free end FE of the speaker 11 refers to an end opposite to a fixed end connected to the ear hook 12 in the speaker 11. The speaker 11 may be a regular or irregular structure, and for further explanation of the free end FE of the speaker 11, an exemplary illustration is provided. For example, when the speaker 11 is a rectangular cuboid structure, a surface of a side wall of the speaker 11 is a plane, and the free end FE of the speaker 11 is the end side wall opposite to the fixed end connected to the ear hook 12 in the speaker 11. For example, when the speaker 11 is a sphere, ellipsoid, or irregular structure, the free end FE of the speaker 11 may refer to a specific region far from the fixed end obtained by cutting the speaker 11 along a Y-Z plane (a plane formed by the short axis direction Z and the thickness direction X). It should be noted that in the wearing state, the free end FE of the speaker 11 may extend into the cavity of auricular concha, and an orthographic projection of the free end FE may fall into a region of the anthelix, and orthographic projection of the free end FE may also fall into a region of left side and right side of the head and the front side of the ear on the sagittal axis of the body. In other words, the ear hook 12 may support the speaker 11 to be worn on the wearing position such as the cavity of auricular concha, the anthelix, and the front side of the ear.

Taking the open headphone 10 shown in FIG. 4 as an example, a detailed description of the open headphone 10 is provided below. It should be noted that, without violating the corresponding acoustic principles, the structures and corresponding parameters of the open headphone 10 in FIG. 4 may also be applied to other configurations of open headphones mentioned above.

By extending at least a portion of the speaker 11 into the cavity of auricular concha, a volume at a listening position (e.g., an opening of the acoustic meatus) may be increased, especially volume with a mid-low frequency, and the good effect for reduce the far-field leakage volume may remain. Merely by way of example, when the overall or a portion of structures of the speaker 11 extends into the cavity of auricular concha, the speaker 11 may form a structure similar to a cavity (hereinafter referred to as a cavity-like structure) with the cavity of auricular concha. In some embodiments of the present disclosure, the cavity-like structure may be understood as a semi-enclosed structure formed by a side wall of the speaker 11 and the cavity of auricular concha, which may make an internal environment and external environment not completely enclosed and isolated. Instead, the cavity-like structure is a leakage structure (e.g., an opening, a gap, a pipeline, etc.) that allows an acoustical connection between the internal environment and the external environment. When the user is wearing the open headphone 10, one or more sound outlets holes may be arranged on a side wall of the housing of the speaker 11 that is close to or facing the acoustic meatus of the user, and the one or more pressure relief holes may be arranged on another side wall (e.g., a side wall far from or away from the acoustic meatus of the user) of the housing of the speaker 11. The one or more sound outlet holes may be acoustically coupled with the front cavity of the open headphone 10, and the one or more pressure relief holes may be acoustically coupled with the rear cavity of the open headphone 10. For example, the speaker 11 includes a sound outlet hole and a pressure relief hole. Sound output from the sound outlet hole and sound output from the pressure relief hole may be approximately regarded as two sound sources. Sound waves of the two sound sources may be in opposite phases. The speaker 11 and an inner wall corresponding to the cavity of auricular concha may form a cavity-like structure, the sound source corresponding to the sound outlet hole may be located in the cavity-like structure, and the sound source corresponding to the pressure relief hole may be located outside the cavity-like structure, thus forming an acoustic model shown in FIG. 5.

Figure 5:
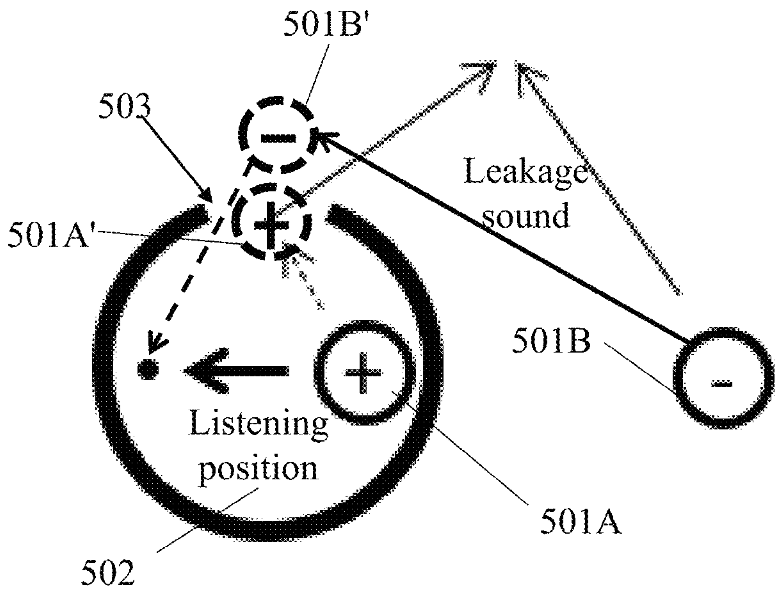
FIG. 5 is a schematic diagram illustrating a cavity structure arranged around a sound source of double sound sources according to some embodiments of the present disclosure.

FIG. 5 is a schematic diagram illustrating a cavity structure arranged around a sound source of double sound sources according to some embodiments of the present disclosure. As shown in FIG. 5, a cavity-like structure 502 may include a listening position and at least one sound source 501A. The term "include" here may indicate that at least one of the listening positions and the sound source 501A is located inside the cavity-like structure 502, or at least one of the listening positions and sound source 501A is located at an inner edge of the cavity-like structure 502. The listening position may be equivalent to an opening of the acoustic meatus, or may be an acoustic reference point of the ear, such as an ear reference point (ERP), an ear-drum reference point (DRP), etc., or may be an entrance structure that guides a listener. Due to the fact that the sound source 501A is surrounded by the cavity-like structure 502, most of sound emitted by the sound source 501A may reach the listening position by a direct radiation way or a reflex way. Relatively, in the absence of cavity-like structure 502, most of the sound emitted by the sound source 501A may not reach the listening position. Therefore, the arrangement of the cavity structure may significantly increase a volume of the sound reaching the listening position. Meanwhile, only a small portion of opposite phase sound emitted by an opposite phase sound source 501B outside the cavity-like structure 502 may enter the cavity-like structure 502 via a leakage structure 503 of the cavity-like structure 502, which may be equivalent to generating a secondary sound source 501B' at the leakage structure 503, and an intensity of sound from the secondary sound source may be significantly lower than an intensity of sound from the sound source 501B, and may also be significantly lower than an intensity of sound from the sound source 501A. The sound generated by the secondary sound source 501B' may have a weak effect for offsetting the sound generated from the sound source 501A in the cavity, significantly increasing a volume of the sound at the listening position. For an aspect of leakage sound, the sound source 501A may emit sound to the external environment via the leakage structure 503 of the cavity, which may be equivalent to generating a secondary sound source 501A' at the leakage structure 503. Since almost all sound emitted by the sound source 501A may output from the leakage structure 503, and a size of the cavity-like structure 502 may be far smaller than a size for evaluating leakage sound (with a difference of at least one order of magnitude), thus an intensity of sound from the secondary sound source 501A' may be considered equivalent to an intensity of sound from the sound source 501A. For the external environment, the secondary sound source 501A' and the sound source 501B form double sound sources to reduce the leakage sound.

In a specific application scenario, an outer wall surface of the housing of the speaker 11 may be a plane or a curved surface, while a contour of the cavity of auricular concha 102 of the user may be an uneven structure. By extending overall of a portion of structures of the speaker 11 into the cavity of auricular concha, a cavity-like structure may be formed between the speaker 11 and the cavity of auricular concha, which may be connected to the external environment. Furthermore, The acoustic model shown in FIG. 5 may be constructed by setting a sound outlet hole at a position where the housing of the speaker 11 faces an opening of the acoustic meatus and is close to an edge of the cavity of auricular concha 102, and setting a pressure relief hole at a position where the speaker 11 is far from or away from the opening of the acoustic meatus, so that the listening position at the opening of the acoustic meatus may be risen and the sound leakage effect in the far field may be reduced when wearing the open headphone 10.

Figure 6:
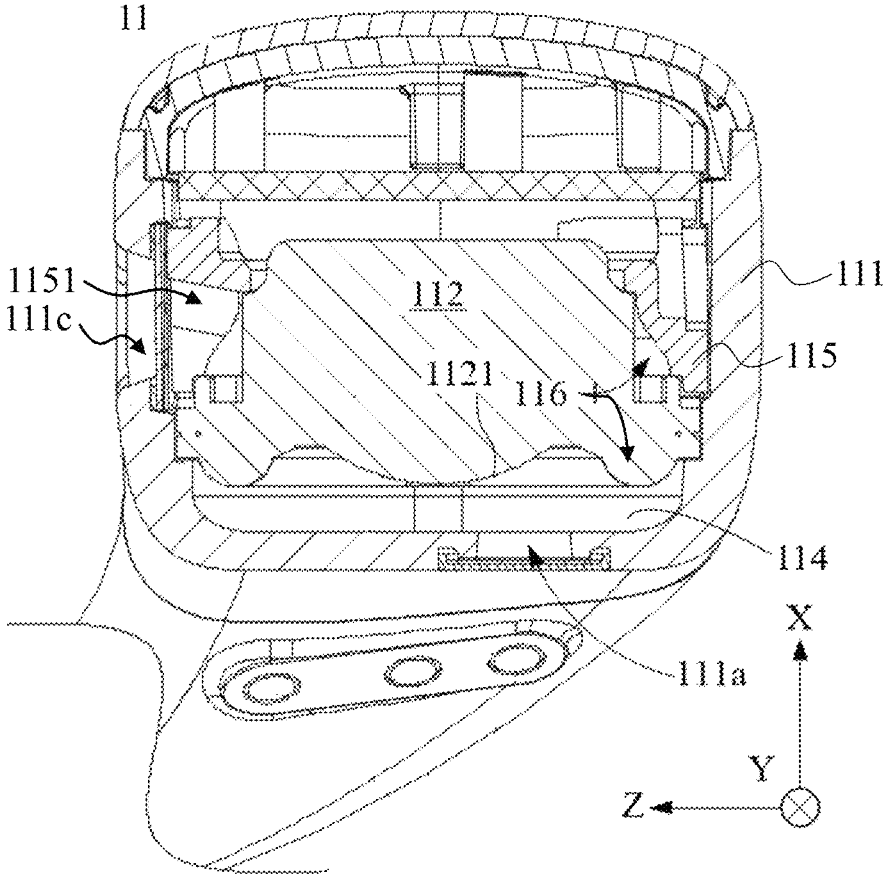
FIG. 6 is a schematic diagram illustrating internal structures of a speaker according to some embodiments of the present disclosure.

FIG. 6 is a schematic diagram illustrating internal structures of a speaker according to some embodiments of the present disclosure. As shown in FIG. 6, in some embodiments, the speaker 11 may include a transducer 112 and a housing 111 that accommodates the transducer 112, and the transducer 112 may include a diaphragm 1121. A front cavity 114 arranged on a front side of the diaphragm 1121 and a rear cavity 116 arranged on a rear side of the diaphragm 1121 may be formed between the diaphragm 1121 and the housing 111. The housing 111 may be provided with a sound outlet hole 111*a* that is acoustically coupled with the front cavity 114 and at least one pressure relief hole (e.g., the first pressure relief hole 111*c* and the second pressure relief hole 111*d*, and the second pressure relief hole 111*d* is not shown in FIG. 6) that is acoustically coupled with the rear cavity 116. A connecting frame 115 may be arranged inside the housing 111. The connection frame 115 may be provided with an acoustic channel 1151, which may be used to connect the first pressure relief hole 111*c* and the rear cavity 116, in order to facilitate the connection between the rear cavity 116 and the external environment. That is, air may freely enter and exit the rear cavity 116, thereby reducing the resistance of the diaphragm of the transducer 112 during a vibration process of the diaphragm.

Figure 7:
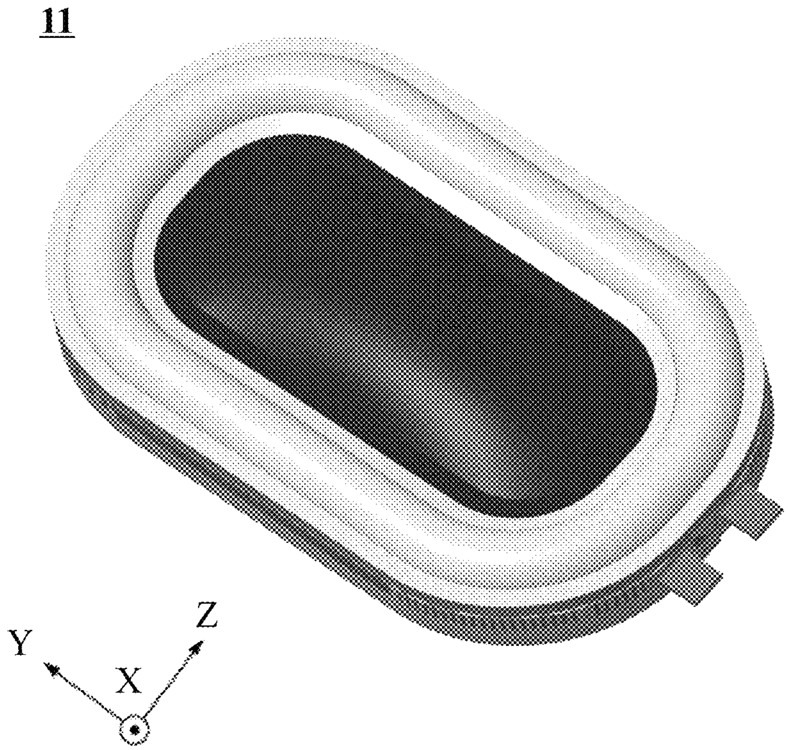
FIG. 7 is an outline drawing of a transducer according to some embodiments of the present disclosure.
Figure 8:
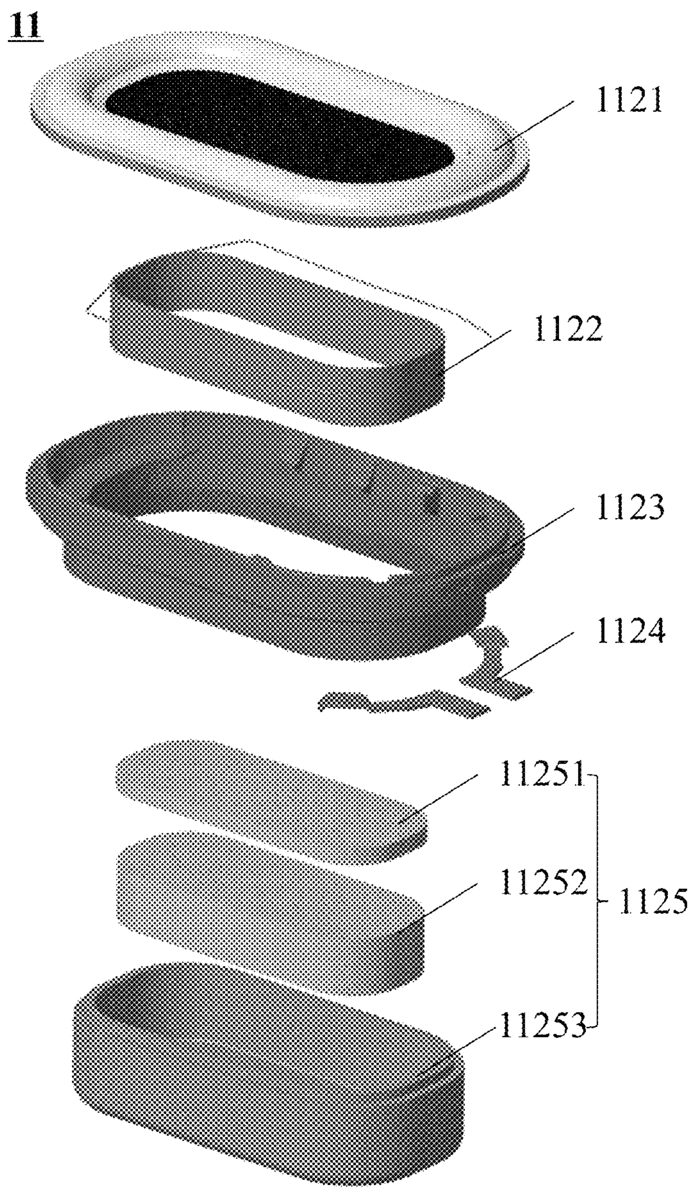
FIG. 8 is an exploded view illustrating an exemplary transducer according to some embodiments of the present disclosure.

FIG. 7 is an outline drawing of a transducer according to some embodiments of the present disclosure. FIG. 8 is an exploded view illustrating an exemplary transducer according to some embodiments of the present disclosure. As shown in FIG. 7 and FIG. 8, in some embodiments, the speaker 11 may include a diaphragm 1121, a coil 1122, a bracket 1123, a terminal 1124, and a magnetic circuit component 1125. The bracket 1123 may provide a fixed installation platform, the speaker 11 may be connected to housing 111 through bracket 1123. The terminal 1124 may be fixed to bracket 1123, and the terminal 1124 may be configured for circuit connections (e.g., connecting leads, etc.). The coil 1122 may connected to the diaphragm 1121 and at least a portion of the coil 1122 may be arranged in a magnetic gap formed by the magnetic circuit component 1125. The magnetic circuit component 1125 may apply a force on the energized coil 1122, thereby driving the diaphragm 1121 to generate mechanical vibration and generate sound through the propagation of media such as air. The magnetic circuit component 1125 may include a magnetic conductive plate 11251, a magnet 11252, and an accommodation member 11253. The magnetic conductive plate 11251 may be arranged between the magnet 11252 and the diaphragm 1121 and may be attached to a surface of the magnet 11252.

Figure 9:
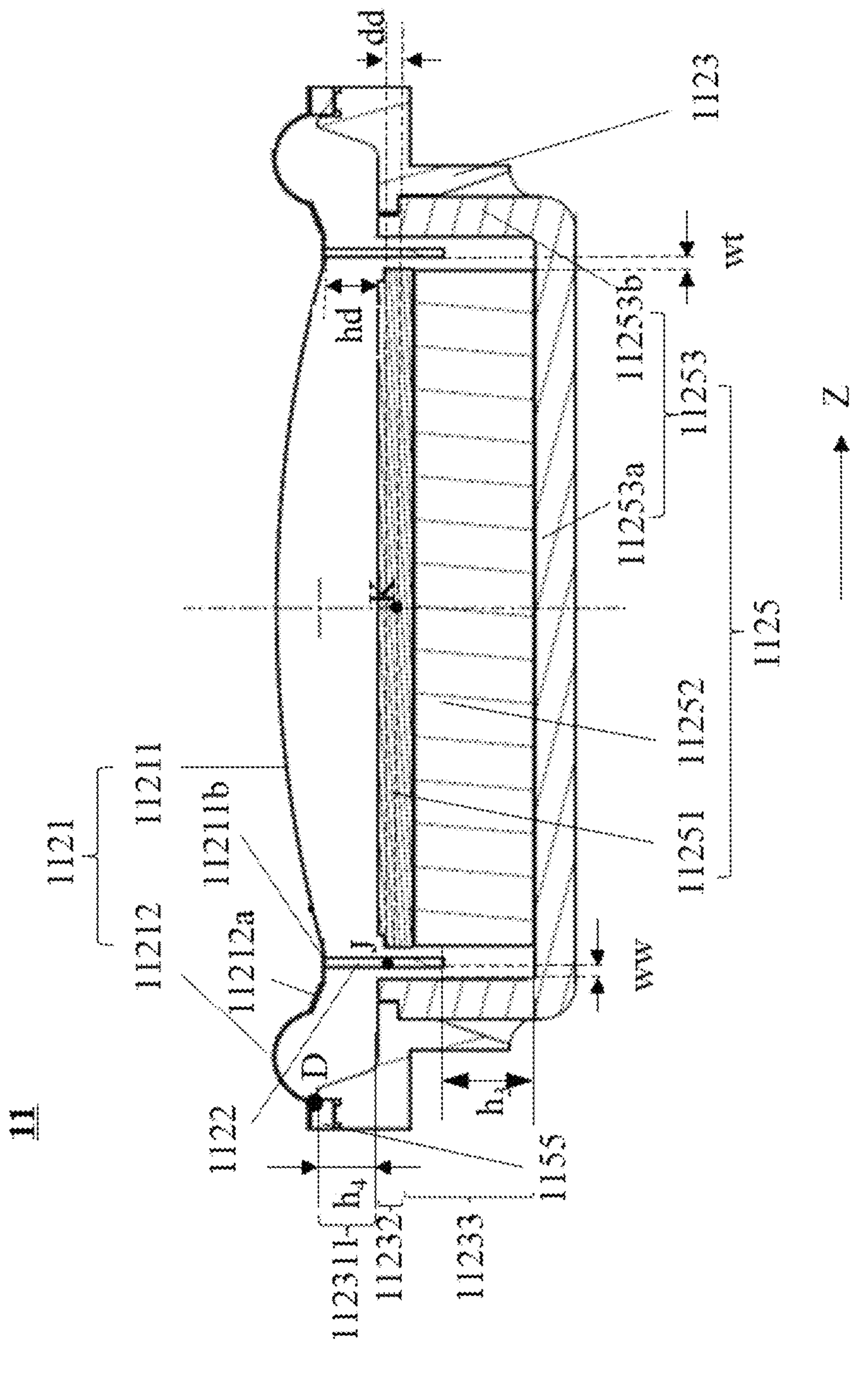
FIG. 9 is another schematic diagram illustrating internal structures of a speaker according to some embodiments of the present disclosure.
Figure 10:
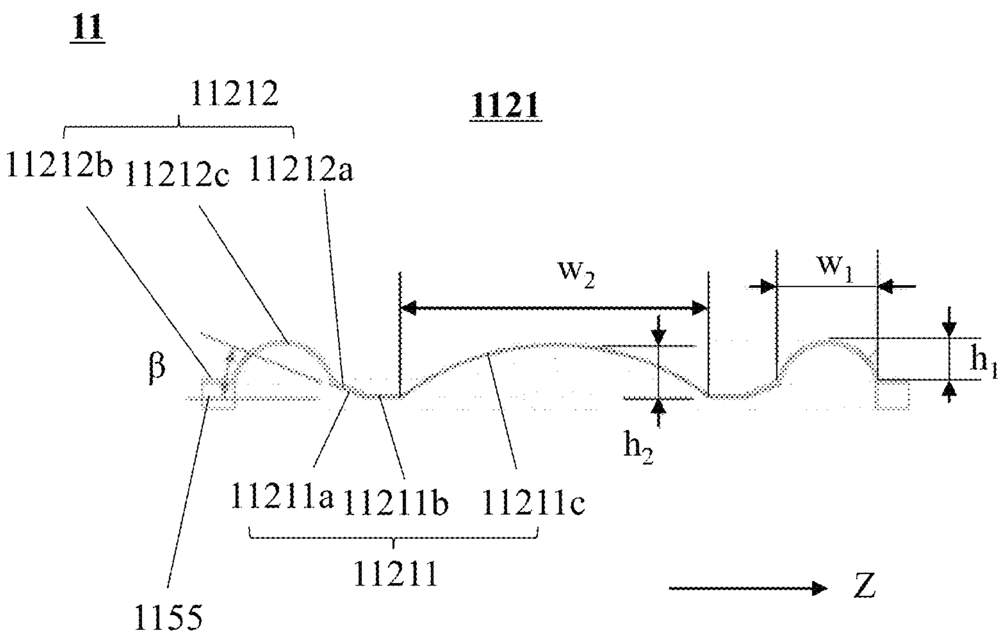
FIG. 10 is a schematic diagram illustrating a structure of a diaphragm according to some embodiments of the present disclosure.

FIG. 9 is another schematic diagram illustrating internal structures of a speaker according to some embodiments of the present disclosure. FIG. 10 is a schematic diagram illustrating a structure of a diaphragm according to some embodiments of the present disclosure. The speaker 11 may include a diaphragm 1121, a coil 1122, a bracket 1123, and a magnetic circuit component 1125. The bracket 1123 may be arranged around diaphragm 1121, coil 1122, and magnetic circuit component 1125 to provide a fixed installation platform. The speaker 11 may be connected to the housing 111 via the bracket 1123. The coil 1122 may extend into the magnetic circuit component 1125 and may be connected to the diaphragm 1121. The magnetic circuit component 1125 may apply a force on the energized coil 1122, driving the diaphragm 1121 to generate a mechanical vibration. The mechanical vibration may be propagated by air and other media to generate sound. The sound may be output from the sound outlet hole. In some embodiments, the magnetic circuit component 1125 may include a magnetic conductive plate 11251, a magnet 11252, and an accommodation member 11253. The magnetic conductive plate 11251 may be connected to the magnet 11252, and a side of the magnet 11252 away from the magnetic conductive plate 11251 may be arranged on a bottom wall of the accommodation member 11253. There may be a gap between a peripheral side of the magnet 11252 and a peripheral inner wall of the accommodation member 11253. In some embodiments, a peripheral outer wall of the accommodation member 11253 may be connected and fixed with the bracket 1123. In some embodiments, both the accommodation member 11253 and the magnetic conductive plate 11251 may be made of a magnetic conductive material (e.g., an iron). In some embodiments, a peripheral side of the diaphragm 1121 may be connected to the bracket 1123 via a fixing ring 1155. In some embodiments, a material of the fixing ring 1155 may include stainless steel or other metal materials to adapt to the manufacturing process of the diaphragm 1121. As shown in FIG. 8, the magnetic circuit component 1125 may include a magnetic conductive plate 11251, a magnet 11252, and an accommodation member 11253. The accommodation member 11253 and the magnetic conductive plate 11251 may both be made of a magnetic material (e.g., the iron). In some embodiments, the accommodation member 11253 may include a bottom 11253*a* of the accommodation member and a side wall 11253*b* on a surrounding side of the accommodation member. The bottom 11253*a* of the accommodation member and the side wall 11253*b* may form an accommodation space, and the magnetic conductive plate 11251 and magnet 11252 may be accommodated within the accommodation space. The magnetic conductive plate 11251 may be connected to the magnet 11252, and a side of the magnet 11252 away from the magnetic conductive plate 11251 may be arranged at the bottom 11253*a* of the accommodation member. There may be a gap between a peripheral side of the magnet 11252 and a side wall 11253*b* of the accommodation member 11253. In some embodiments, the coil 1122 may extend into the gap between the magnet 11252 and the side wall 11253*b*.

In some embodiments, in order to improve the utilization efficiency of a magnetic field generated by the magnetic circuit component 1125 by arranging at least a portion of the coil 1122 to be located in a region with high magnetic flux density during a vibration process of the diaphragm 1121, a distance dd between a center point J of the coil 1122 and a center point K of the magnetic conductive plate 11251 in a vibration direction of the diaphragm 1121 may be less than 0.3 mm. For example, the center point J of the coil 1122 and the center point K of the magnetic conductive plate 11251 may be basically arranged on the same horizontal line, so that the magnetic circuit component 1125 may generate a great force on the coil 1122, thus providing power for the vibration of the diaphragm 1121.

As shown in FIG. 9 and FIG. 10. In some embodiments, the diaphragm 1121 may include a main-body region 11211 and a folded-ring region 11212 surrounding the main-body region 11211. In some embodiments, the main-body region 11211 may include a first inclined section 11211*a* and a first connecting section 11211*b* connected to the coil 1122. As shown in FIG. 9, the first connection section 11211*b* may be used to connect the coil 1122, and the first connection section 11211*b* may be parallel to the short axis direction Z and perpendicular to the vibration direction of the diaphragm. The first inclined section 11211*a* may be attached to a portion of the folded-ring region 11212. In some embodiments, the first inclined section 11211*a* may be tilted in a direction away from the coil 1122 with respect to the first connecting section 11211*b*. As shown in FIG. 9 and FIG. 10, the coil 1122 may be arranged on a lower side of the first connecting section 11211*b*, and the first inclined section 11211*a* may be tilted upwards (i.e., the direction away from the coil 1122) with respect to the first connecting section 11211*b*. Through the above arrangement, a situation that an adhesive used for bonding the coil 1122 to the diaphragm 1121 overflows into the folded-ring region 11212, thus causing the adhesive to corrode the folded-ring region 11212 and affecting the vibration performance of the diaphragm 1121 may be avoided.

In some embodiments, a magnetic circuit component 1125 mainly includes a magnetic conductive plate 11251, a magnet 11252, and an accommodation member 11253. The magnetic conductive plate 11251 may be connected to the magnet 11252, and a side of the magnet 11252 away from the magnetic conductive plate 11251 may be arranged on a bottom wall of the accommodation member 11253. There may be a gap between a peripheral side of the magnet 11252 and a peripheral inner wall of the accommodation member 11253. The coil 1122 may extend into the gap between the magnet 11252 and the accommodation member 11253. When a distance between the coil 1122 and a side wall of the accommodation member 11253 is too long, the coil may not be located in a region with a high magnetic flux density of the magnetic circuit component 1125, thus weakening power provided by the magnetic circuit component 1125 to the diaphragm 1121. When the distance is too short, there may be a risk of the coil 1121 colliding with the accommodation member 11253. Therefore, in order to avoid collision of coil 1121 and ensure that the magnetic field may provide power to the diaphragm 1121, in some embodiments, a distance wt between coil 1122 and a side wall of magnet 11252 in the gap may be within a range of 0.1 mm-0.25 mm, and a distance ww between the coil 1122 and the peripheral inner wall of the accommodation member 11253 may be within a range of 0.1 mm-0.5 mm. In some embodiments, the distance wt between the coil 1122 and the side wall of the magnet 11252 may be within a range of 0.12 mm-0.24 mm, and the distance ww between the coil 1122 and the peripheral inner wall of the accommodation member 11253 may be within a range of 0.15 mm-0.3 mm. In some embodiments, in the gap, the distance wt between the coil 1122 and the side wall of the magnet 11252 may be within a range of 0.17 mm-0.21 mm, and the distance ww between the coil 1122 and the peripheral inner wall of the accommodation member 11253 may be within a range of 0.19 mm-0.23 mm. In some embodiments, the distance wt between the coil 1122 and the side wall of the magnet 11252 may be 0.2 mm, and the distance ww between the coil 1122 and the peripheral inner wall of the accommodation member 11253 may be 0.2 mm. If a distance h3 between the coil 1122 and a bottom 11253*a* of the accommodation member 11253 is too short, a volume of the speaker 11 may increase. Along the vibration direction of the diaphragm 1121, if the distance h3 between the coil 1122 and the bottom 11253*a* of the accommodation member 11253 is too short, the coil 1121 may collide with the accommodation member 11253. Therefore, in order to avoid an excessive volume of the speaker 11 and a collision of the coil 1121, in some embodiments, the distance h3 (i.e., a distance between an end of the coil 1122 away from the diaphragm 1121 and the bottom wall of the accommodation member 11253) between the coil 1122 and the bottom 11253*a* of the accommodation member 11253 may be within a range of 0.2 mm-4 mm. In some embodiments, the distance h3 between the coil 1122 and the bottom wall of the accommodation member 11253 may be within a range of 0.6 mm-3 mm. In some embodiments, the distance h3 between the coil 1122 and the bottom wall of the accommodation member 11253 may be within a range of 1 mm-2 mm. In some embodiments, the distance h3 between the coil 1122 and the bottom wall of the accommodation member 11253 may be within a range of 1.4 mm-1.6 mm.

In some embodiments, by adjusting an inclination angle β of the first inclined section 11211*a* with respect to the first connecting section 11211*b*, a relative position of coil 1122 and magnetic circuit component 1125 may be changed, so that a thrust on the coil 1122 may be generally consistent, and then a low-frequency distortion of the speaker 11 may be adjusted to enrich a low-frequency listening experience. In addition, by adjusting the inclination angle β of the first inclined section 11211*a* with respect to the first connecting section 11211*b*, the coil 1122 overflowing adhesive to the folded-ring region 11212 may be prevented, thus preventing corrosion of the folded-ring region 11212 to affect the vibration of the folded-ring area 11212. The inclination angle β of the first inclined section 11211*a* with respect to the first connecting section 11211*b* refers to an angle between a direction of the first inclined section 11211*a* away from the first connecting section 11211*b* and a straight line where the first connecting section 11211*b* is located, which is shown in FIG. 10.

In some embodiments, in order to reduce the distortion of the speaker 11 and avoid the folded-ring region 11212 being corroded to affect the vibration of the folded-ring region 11212, the inclination angle β of the first inclined section 11211*a* with respect to the first connecting section 11211*b* may be within a range of 5°-30°. In some embodiments, in order to further reduce the distortion of the speaker 11, the inclination angle β of the first inclined section 11211*a* with respect to the first connecting section 11211*b* may be within a range of 10°-25°. For example, the inclination angle β of the first inclined section 11211*a* with respect to the first connecting section 11211*b* may be 15°. For example, the inclination angle β of the first inclined section 11211*a* with respect to the first connecting section 11211*b* may be 22°.

In some embodiments, a minimum distance between the coil 1122 and the first inclined section 11212*a* may not be less than 0.3 mm. That is, a distance between a connection point between the first inclined section 11212*a* and the first connecting section 11211*b*, and a connection region between the coil 1122 and the first connecting section 11211*b* may not be less than 0.3 mm, thus to maintain a safe distance between an arrangement position of the folded-ring region 11212 and the coil 1122, and prevent the adhesive for arranging the coil 1122 from overflowing into the folded-ring region 11212.

In some embodiments, the folded-ring region 11212 may include a second inclined section 11212*a*, and at least part of the second inclined section 11212*a* may be attached to the first inclined section 11211*a*. The main-body region 11211 and the folded-ring region 11212 may connected based on the first inclined section 11211*a* and the second inclined section 11212*a*. In some embodiments, in order to simplify an arrangement process, the first inclined section 11211*a* and the second inclined section 11212*a* may be connected by an adhesive. In some embodiments, in order to achieve the connection between the main-body region 11211 and the folded-ring region 11212, the second inclined section 11212*a* may be arranged on a side of the first inclined section 11211*a* near the coil 1122. In some embodiments, in order to achieve the connection between the main-body region 11211 and the folded-ring region 11212, and to further reduce a corrosion degree of the adhesive on the folded-ring region 11212 during a process of bonding the coil 1122, the second inclined section 11212*a* may be arranged on a side of the first inclined section 11211*a* away from the coil 1122.

Due to a large amplitude of the vibration of the diaphragm 1121 at a low frequency, if the folded-ring region 11212 is a planar structure, a deformation ability of the folded-region 11212 may be poor, which may affect the amplitude of vibration of the diaphragm 1121. Therefore, in order to ensure the good deformation ability of the diaphragm 1121, in some embodiments, the folded-ring region 11212 may include an arc-shaped section 11212*c*.

In some embodiments, a ratio of a height $h_1$ of the arc-shaped section 11212*c* to a span $w_1$ of the arc-shaped section 11212*c* may affect the deformation ability of the arc-shaped section 11212*c*. The height of the arc-shaped section 11212*c* refers to a distance between a highest point of the arc-shaped section 11212*c* and a lowest point of the arc-shaped section 11212*c* in the vibration direction of diaphragm 1121. As shown in FIG. 10, the height of the arc-shaped section 11212*c* is designated as $h_1$. The span of arc-shaped section 11212*c* refers to a maximum distance between upper two points of arc-shaped section 11212*c*. As shown in FIG. 10, the span of arc segment 11212*c* is designated as $w_1$. If the ratio of height $h_1$ to span $w_1$ of arc-shaped section 11212*c* is too small, a protrusion degree of arc-shaped section 11212*c* is too small, and a shape of the arc-shaped section 11212*c* may be close to a planar structure, resulting in poor deformation ability of the arc-shaped section 11212*c*. If the ratio of height $h_1$ to span $w_1$ of arc-shaped section 11212*c* is too large, the protrusion degree of arc-shaped section 11212*c* is too large, and the vibration of diaphragm 1121 is greatly hindered, thus affecting an output of the speaker 11. Therefore, in some embodiments, in order to achieve the better output and lower distortion of the speaker 11, the ratio of height $h_1$ to span $w_1$ of the arc-shaped section 11212*c* may be within a range of 0.35-0.4. In some embodiments, in order to further enhance the output of the speaker 11, the ratio of height $h_1$ to span $w_1$ of the arc-shaped section 11212*c* may be within a range of within a range of 0.36 to 0.39. In some embodiments, in order to further reduce the distortion of the speaker 11, the ratio of height $h_1$ to span $w_1$ of the arc-shaped section 11212*c* may be within a range of 0.37-0.38. For example, the ratio of height $h_1$ to span $w_1$ of the arc-shaped section 11212*c* may be 0.38.

In some embodiments, the height $h_1$ of the arc-shaped section 11212*c* may be within a range of 0.5 mm-0.7 mm. For example, the height $h_1$ of the arc-shaped section 11212*c* may be within a range of 0.55 mm-0.65 mm. In some embodiments, the height $h_1$ of the arc-shaped section 11212*c* may be within a range of 0.6 mm. Considering an error in a size of the arc-shaped section 11212*c*, in some embodiments, the height $h_1$ of the arc-shaped section 11212*c* may be 0.6 mm±0.05 mm. In some embodiments, the span (width) $w_2$ of the arc-shaped section 11212*c* of the folded-ring region 11212 may be less than twice of a curvature radius r1 of the arc-shaped section 11212*c*. In some embodiments, the curvature radius r1 of the arc-shaped section 11212*c* of the folded-ring region 11212 may be within a range of 0.7 mm-0.9 mm. In some embodiments, the curvature radius r1 of the arc-shaped section 11212*c* of the folded-ring region 11212 may be within a range of 0.75 mm-0.88 mm. In some embodiments, the curvature radius r1 of the arc-shaped section 11212*c* of the folded-ring region 11212 may be within a range of 0.8 mm-0.83 mm. In some embodiments, the span $w_1$ of the arc-shaped section 11212*c* of the folded-ring region 11212 may be within a range of 1.2 mm-1.7 mm. In some embodiments, the span $w_1$ of the arc-shaped section 11212*c* of the folded-ring region 11212 may be within a range of 1.3 mm-1.65 mm. In some embodiments, the span $w_1$ of the arc-shaped section 11212*c* of the folded-ring region 11212 may be within a range of 1.5 mm-1.6 mm. In some embodiments, the curvature radius r1 of the arc-shaped section 11212*c* of the folded-ring region 11212 may be 0.82 mm, and the span $w_1$ of the arc-shaped section 11212*c* of the folded-ring region 11212 may be 1.58 mm. Considering the error in the size of the arc-shape section 11212*c*, in some embodiments, the curvature radius r1 of the arc-shaped section 11212*c* of the folded-ring region 11212 may be 0.82 mm±0.05 mm, and the span $w_1$ of the arc-shaped section 11212*c* in the folded-ring region 11212 may be 1.58 mm±0.1 mm.

In some embodiments, the folded-ring region 11212 may also include a wavy structure composed of a plurality of arc-shaped sections 11212*c*, and any two adjacent arc-shaped sections 11212*c* may face opposite directions. The arrangement of the wavy structure may make resistance received by the diaphragm 1121 symmetrical when the diaphragm 1121 vibrates upwards and downwards, thus reducing the distortion of the speaker 11 and improving the output of the speaker 11 at a low frequency. In some embodiments, the ratio of height to span of each arc-shaped section 11212*c* of the plurality of arc-shaped section 11212*c* may be consistent with the ratio of height to span of a single arc-shaped section 11212*c* mentioned above. In some embodiments, the ratio of height to span of each arc-shaped section 11212*c* of the plurality of arc-shape sections 11212*c* may be different. For example, in a radial direction of the diaphragm 1121, the height of each arc-shaped section 11212*c* of the plurality of arc-shape sections 11212*c* may gradually decrease from a center to an edge of the diaphragm 1121, and the span of each arc-shaped section 11212*c* may be the same.

In order to constrain the diaphragm 1121 when the diaphragm is significantly vibrating and prevent the coil 1122 from attaching the magnetic circuit component 1125, in some embodiments, the main-body region 11211 may include an arch-shaped dome 11211*c* arranged at an end of the first connecting section 11211*b* far from the first inclined section 11211*a*, and an arching direction of the arch-shaped dome 11211*c* may be the same as an arching direction of the arc-shaped section 11212*c*, that is, the arch-shaped dome 11211*c* may face towards a side away from the coil 1122. The arch-shaped dome 11211*c* may prevent the diaphragm 1121 from shaking during significant vibrations, ensuring that the coil 1122 does not collide with the magnetic component 1125. At the same time, a strength and a stiffness of the arch-shaped dome 11211*c* may be high, thus a split vibration of the main-body region 11211 may be suppressed to some extent, thereby improving the high-frequency vibration feature of the transducer 112. In the absence of a front cover, an aspect ratio (i.e., a ratio of a height of dome to a span of the dome) of the dome increases, resulting in an increase in high-frequency bandwidth. However, an excessively high aspect ratio of the dome may cause an increase in unevenness and overall size.

In some embodiments, a height $h_2$ of the dome 11211*c* may be related to a size of the dome 11211*c* in an extension direction (i.e., a size of the span $w_2$ of the dome) of an arch of the dome. The height of the dome 11211*c* refers to a distance between a highest point of the dome 11211*c* and a lowest point of the dome 11211*c* (i.e., an endpoint connected to the first connecting section 11211*b*) in the vibration direction of the diaphragm 1121. As shown in FIG. 10, the height of the dome 11211*c* is designated as $h_2$. The span of the dome 11211*c* refers to a maximum distance between two points above the dome 11211*c*. As shown in FIG. 10, the span of the dome 11211*c* is designated as $w_2$. When the span $w_2$ of the dome 11211*c* is changed to lager, in order to maintain an arch structure of the dome 11211*c* (e.g., keeping a radian of the dome 11211*c* within a preset radian range), the height $h_2$ of the dome 11211*c* may also be higher, which may cause a thickness of the transducer 112 being too large. Taking into account the thickness and structural design of the transducer 112, in some embodiments, the preset radian range of the dome 11211*c* of the main-body region 11211 of the diaphragm 1121 may be 0.5263 rad-3.1416 rad. In some embodiments, the preset radian range of the dome 11211*c* of the main-body region 11211 of the diaphragm 1121 may be 0.7869 rad-3.1416 rad. In some embodiments, the preset radian range of the dome 11211*c* of the main-body region 11211 of the diaphragm 1121 may be 1.0526 rad-3.1416 rad. In some embodiments, the preset radian range of the dome 11211*c* of the main-body region 11211 of the diaphragm 1121 may be 1.5789 rad-3.1416 rad. In some embodiments, the preset radian range of the dome 11211*c* of the main-body region 11211 of the diaphragm 1121 may be 2.1053 rad-3.1416 rad. In some embodiments, the preset radian range of the dome 11211*c* of the main-body region 11211 of the diaphragm 1121 may be 2.6316 rad-3.1416 rad. In some embodiments, the span $w_2$ of the dome 11211*c* of the main-body region 11211 may be within a range of 2 mm-8 mm. In some embodiments, the span $w_2$ of the dome 11211*c* of the main-body region 11211 may be within a range of 3 mm-7 mm. In some embodiments, the span $w_2$ of the dome 11211*c* of the main-body region 11211 may be within a range of 4 mm-6 mm. In some embodiments, the span $w_2$ of the dome 11211*c* of the main-body region 11211 may be 4.8 mm. In some embodiments, the height $h_2$ of the dome 11211*c* of the main-body region 11211 (i.e., the distance between the highest point and the lowest point of the dome 11211*c* in the vibration direction of the diaphragm) may be within a range of 0.7 mm-1.2 mm. In some embodiments, the height $h_2$ of the dome 11211*c* of the main-body region 11211 may be within a range of 0.9 mm-1.1 mm. In some embodiments, the height $h_2$ of the dome 11211*c* of the main-body region 11211 may be within a range of 1 mm-1.05 mm. In some embodiments, the height $h_2$ of the dome 11211*c* of the main-body region 11211 may be 0.8 mm. In some embodiments, due to a machining error, the height $h_2$ of the dome 11211*c* of the main-body region 11211 may be 0.8 mm±0.08 mm.

In some embodiments, the ratio of the height $h_2$ of the dome 11211*c* to the span $w_2$ of the dome 11211*c* may affect a size of the speaker 11 and the vibration of the diaphragm 1121. If the ratio of the height $h_2$ of the dome 11211*c* to the span $w_2$ of the dome is too small, a protrusion of the dome 11211*c* may be too small, the shape of the dome 11211*c* may be close to a planar structure, and a strength and a stiffness of the dome 11211*c* may be low. The spilt vibration may be performed on the dome 11211*c*, leading to more peaks and valleys in a high-frequency region, affecting the high-frequency vibration feature of the transducer 112. If the ratio of the height $h_2$ of the dome 11211*c* to the span $w_2$ of the dome is too large, the protrusion of the spherical top 11211*c* may be too large, and the thickness of the transducer 112 may be too large, resulting in an increase in unevenness and the size of the transducer 112. Therefore, in order to ensure the thickness and size of the speaker 11, and improve the high-frequency vibration feature of the speaker 11, the ratio of the height $h_2$ of the dome 11211*c* to the span $w_2$ of the dome 11211*c* may be within a range of 0.1-0.6. In some embodiments, in order to further improve the high-frequency vibration feature of the transducer 112, the ratio of the height $h_2$ of the dome 11211*c* to the span $w_2$ of the dome 11211*c* may be in a range of 0.1-0.4. In some embodiments, in order to further improve the high-frequency vibration feature of the transducer 112, the ratio of the height $h_2$ of the dome 11211*c* to the span $w_2$ of the dome 11211*c* may be in a range of 0.1-0.3.

In some embodiments, taking into account a structural strength, a difficulty in process implementation, and a limitation of the thickness of the speaker 11, while meeting the maximum amplitude of the diaphragm 1121, in order to prevent the diaphragm 1121 from colliding with the magnetic plate 11251 during the vibration process, a distance (a distance hd shown in FIG. 9) between the lowest point of the dome 11211*c* of the main-body region 11211 of the diaphragm 1121 and a top of the magnetic conductive plate 11251 of the magnetic circuit component 1125 may be greater than 0.8 mm. In some embodiments, the distance hd between the lowest point of the dome 11211*c* of the main-body region 11211 of the diaphragm 1121 and the top of the magnetic conductive plate 11251 in the magnetic circuit component 1125 may be within a range of 0.85 mm-0.95 mm, which may be 0.9 mm±0.05 mm. 0.9 mm may be a size of a structure, and 0.05 mm may be a size of an error range. In some embodiments, the distance hd between the lowest point of the dome 11211*c* of the main-body region 11211 of the diaphragm 1121 and the top of the magnetic conductive plate 11251 of the magnetic circuit component 1125 may be within a range of 0.86 mm-0.93 mm. In some embodiments, the distance hd between the lowest point of the dome 11211*c* of the main-body region 11211 of the diaphragm 1121 and the top of the magnetic conductive plate 11251 of the magnetic circuit component 1125 may be within a range of 0.88 mm-0.92 mm.

Figure 11A:
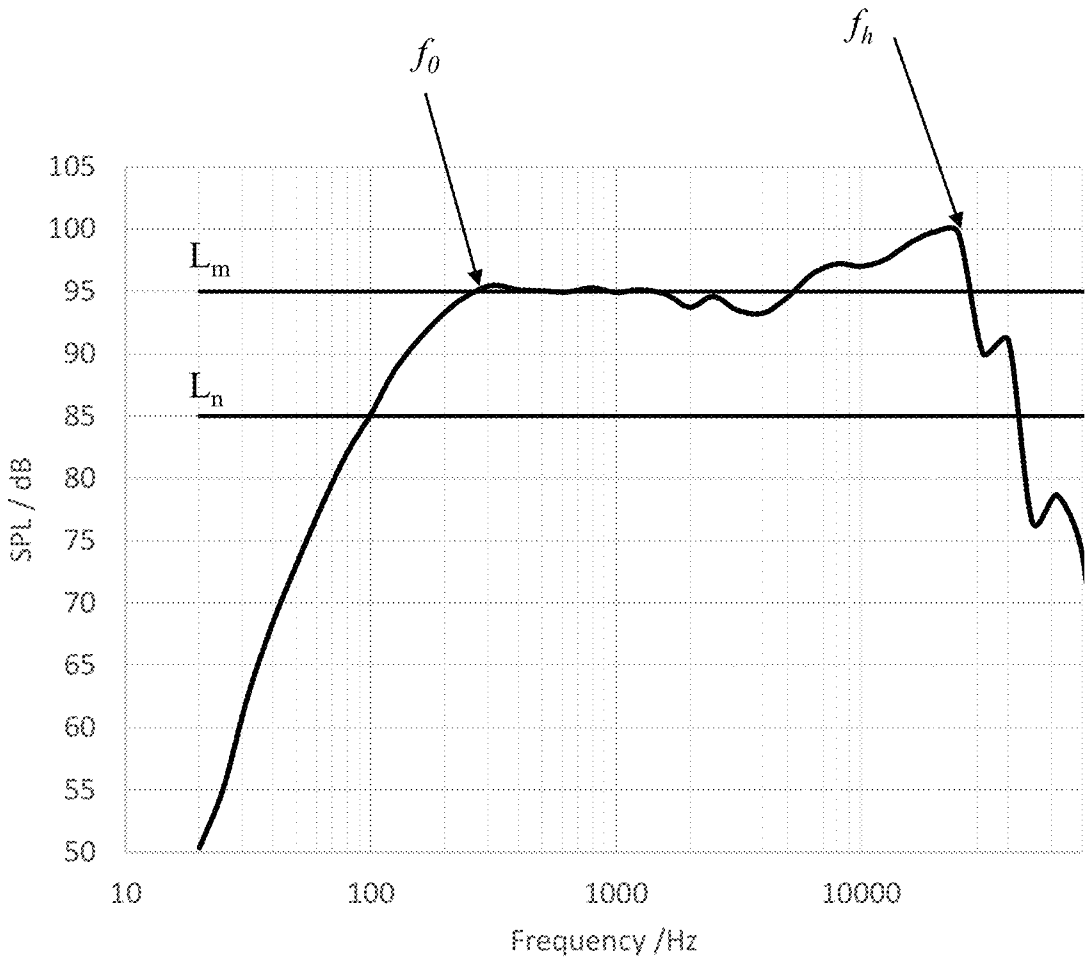
FIG. 11A is a schematic diagram illustrating a high frequency bandwidth of a speaker according to some embodiments of the present disclosure.

FIG. 11A is a schematic diagram illustrating a high frequency bandwidth of a speaker according to some embodiments of the present disclosure. As shown in FIG. 11A, there is a first inflection point $f_0$ in a low-frequency region of a frequency response curve of the speaker 11, and a frequency corresponding to the first inflection point $f_0$ is approximately around 300 Hz. The first inflection point $f_0$ may be related to the softness, hardness of the folded-ring region 11212 of the diaphragm 1121, and a vibration weight (mainly a weight of the main-body region 11211). A frequency corresponding to a second inflection point $f_h$ is around 25 kHz, which may be determined based on an overall trend of the frequency response curve. When $f_h$=25 kHz, although there may be local small peaks on the frequency response curve, the overall trend may be in decreasing. Peak values of the frequency band between $f_0$ and $f_h$ (i.e., between 300 Hz-25 kHz) may be filtered to obtain an average value of the peak values to form a first reference line $L_m$, as shown in the upper straight line in FIG. 11A. A second straight line $L_n$ (as shown in the lower straight line in FIG. 11A) may be determined by decreasing the reference line $L_m$ with 10 dB, that is, a bandwidth is determined within a range of 100 Hz-45 kHz.

In some embodiments, a frequency of a high-frequency spilt vibration of the diaphragm 1121 may be proportional to E/ρ. E represents a Young's modulus of the diaphragm 1121. ρ represents an equivalent density of the diaphragm 1121. Therefore, E/ρ determines a high frequency bandwidth. When E is a fixed value, the less the mass of the diaphragm 1121 is, the less the equivalent density ρ of the diaphragm 1121 is, the greater the value of the E/ρ is, and the wider the high-frequency bandwidth is. When ρ is a fixed value, the greater the Young's modulus E of the diaphragm 1121 is, the greater the value of the E/ρ is, the greater a frequency of a high-frequency spilt vibration of the diaphragm 1121 is, and the wider the high-frequency bandwidth is.

In some embodiments, a region of the high-frequency spilt vibration of the speaker 11 refers to a region where the frequency response curve reaches a peak, and the frequency response sharply decreases and alternates between peak and valley values. As shown in FIG. 11A, after the frequency response curve reaches the peak (i.e., a sound pressure level corresponding to a point of $f_h$), a region of right the point of $f_h$ where the frequency response sharply decreases and alternates between peak and valley values may be the region of the high-frequency spilt vibration. A frequency corresponding to a point at which the curve reaches the peak may be a frequency at which the high-frequency spilt vibration occurs (i.e., a point of $f_h$ as shown in FIG. 11A). In some embodiments, in order to avoid a significant difference in vibrations between different parts of the main-body region 11211, resulting in poor high-frequency performance, the frequency of high-frequency spilt vibration in the main-body region 11211 (the dome 11211*c*) may be adjusted to have a wide high-frequency bandwidth of the diaphragm 1121 while reducing the occurrence of high-frequency spilt vibrations within a bandwidth region. In some embodiments, a frequency of the high-frequency spilt vibration of the dome 11211*c* may be no less than 20 kHz. For example, the frequency of the high-frequency spilt vibration of the dome 11211*c* may be no less than 25 kHz. In some embodiments, in order to ensure that the output of the main-body region 11211 is high within an effective frequency band, a mass of the main-body region 11211 may need to be small to reduce a vibration difficulty of the main-body region 11211 within the effective frequency band. Therefore, a material and a structure with lower density and higher strength may be used for making the main-body region 11211. Therefore, the Young's modulus of the dome 11211*c* may be no less than 6 GPa. In some embodiments, the Young's modulus of the dome 11211*c* may be within a range of 6 GPa-7 GPa. For example, the Young's modulus of the dome 11211*c* may be 6.5 GPa. The Young's modulus of the dome 11211*c* may be measured by a static or a dynamic method (e.g., a pulse excitation method, an acoustic resonance method, a sound velocity method, etc.).

Figure 11B:
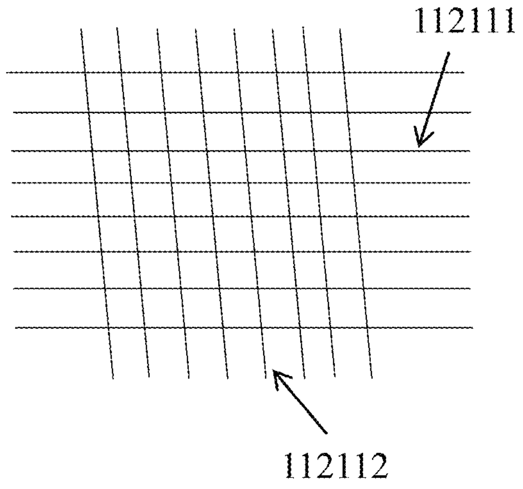
FIG. 11B is a schematic diagram illustrating an interlaced structure of carbon fibers according to some embodiments of the present disclosure.

In some embodiments, the main-body region 11211 may be made of a material of carbon fiber. FIG. 11B is a schematic diagram illustrating an interlaced structure of carbon fibers according to some embodiments of the present disclosure. The performances of the low density and high strength of the carbon fiber are beneficial for weakening a higher-order mode of the speaker 11. In some embodiments, in order to further increase the strength of the main-body region 11211 and reduce the equivalent density of the main-body region 11211, the main-body region 11211 may be formed by carbon fibers arranged in an interlacing arrangement, and at least a portion of the carbon fibers may be interlaced at a first angle. In some embodiments, the first angle may be within a range of 45°-90°. For example, a plurality of independent carbon fibers may be interlaced at an angle such as 45°, 60°, 90°, etc. As shown in FIG. 11B, the plurality of carbon fibers 112111 and 112112 may be interlaced at an angle close to 90°. In some embodiments, due to a fine nature of carbon fibers, the plurality of carbon fibers 112111 and 112112 may be laid at an angle close to 90° and be connected based on an adhesive bonding. In some embodiments, the main-body region 11211 may include the interlacing arrangement structure with a plurality of layers (e.g., 2 layers, 3 layers, etc.) of carbon fibers. In order to facilitate the interlacing arrangement of carbon fibers, in some embodiments, a length of a single carbon fiber may not be less than 5 mm. In some embodiments, the length of the single carbon fiber may be within a range of 5 mm-10 mm. For example, the length of a single carbon fiber may be 7 mm. Due to the fine size of a single carbon fiber, it may be difficult to interlace the carbon fiber one by one, making it difficult to achieve the interlacing arrangement. In some embodiments, the plurality of carbon fibers may be interlaced and connected (e.g., through the adhesive bonding, etc.) to form a plurality of sets of carbon fibers, which may interlace in warp and weft.

In some embodiments, in order to reduce the weight of the main-body region 11211, a thickness of the main-body region 11211 may be adjusted using a super-aligned carbon fiber structure to obtain a specific high-frequency bandwidth. In some embodiments, the thickness of the main-body region 11211 may be less than 80 μm. In some embodiments, the thickness of the main-body region 11211 may be within a range of 10 μm-60 μm. In some embodiments, the thickness of the main-body region 11211 may be 25 μm.

Figure 12:
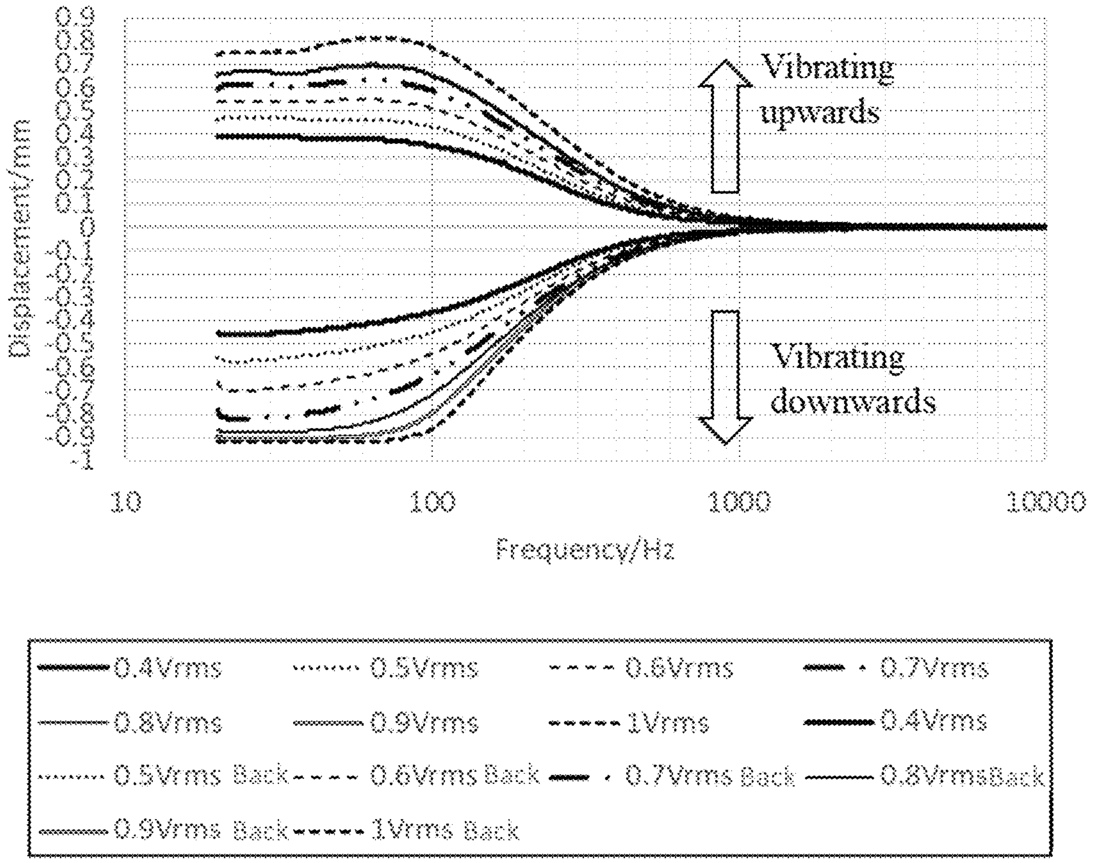
FIG. 12 is a schematic diagram illustrating amplitudes of a speaker under different driving voltages according to some embodiments of the present disclosure.

FIG. 12 is a schematic diagram illustrating amplitudes of a speaker under different driving voltages according to some embodiments of the present disclosure. As shown in FIG. 12, under the same voltage, an amplitude of the vibration of the diaphragm 1121 of the transducer 112 may be different in two opposite directions (as shown in a positive direction and a negative direction of a thickness direction X in FIG. 6, i.e., the positive direction and the negative direction of a longitudinal axis in FIG. 12), which may be caused by an asymmetry of the diaphragm 1121. As shown in FIG. 12, a unit Vrms represents an effective voltage value of a sinusoidal AC signal. For example, 0.7 Vrms represents an effective voltage value of an input sinusoidal AC signal being 0.7V. As shown in FIG. 12, within a range of 0.4V-

0.7V of the input voltage, an amplitude (about 0.8 mm) of the vibration of the diaphragm 1121 when the diaphragm 1121 vibrates downwards (towards a negative direction of the longitudinal axis) is greater than an amplitude (about 0.6 mm) of the vibration of the diaphragm 1121 when the diaphragm 1121 vibrates upwards (towards a positive direction of the longitudinal axis). The diaphragm 1121 vibrating upwards refers to the vibration of the diaphragm 1121 towards the front cavity 114, and the diaphragm 1121 vibrating downwards refers to the vibration of diaphragm 1121 towards the rear cavity 116 (towards the magnetic circuit component 1125). As shown in FIG. 12, as the input voltage continues to increase (e.g., from 0.7V to 1V), a change of the amplitude of the diaphragm 1121 may gradually decrease and eventually approach a threshold. The amplitude of diaphragm 1121 when the diaphragm 1121 vibrates upwards may approach a first threshold (about 0.9 mm), and the amplitude of the vibration of the diaphragm when the diaphragm 1121 vibrates upwards may approach a second threshold (about 0.8 mm). Due to the fact that the amplitude of the vibration of the diaphragm 1121 when the diaphragm 1121 vibrates downwards is greater than the amplitude of the vibration of the diaphragm 1121 when the diaphragm 1121 vibrates upwards, the amplitude of diaphragm 1121 mentioned in the present disclosure refers to the amplitude of the vibration of the diaphragm 1121 when the diaphragm 1121 vibrates downwards. In some embodiments, in order to avoid collision between the coil 1122 and the magnetic circuit component 1125 during vibration of the diaphragm 1121, a maximum amplitude of the diaphragm 1121 may not be exceed 0.8 mm. That is, the amplitude of the diaphragm 1121 may be within a range of 0 mm-0.8 mm. In some embodiments, the amplitude of diaphragm 1121 may be in a range of 0 mm-0.75 mm. In some embodiments, the amplitude of diaphragm 1121 may be within a range of 0 mm-0.7 mm.

In some embodiments, within the range of 0 mm-0.8 mm of the amplitude, a difference between two amplitudes of the diaphragm 1121 vibrating in two opposite directions (i.e., vibrating upwards and downwards) may be less than 0.05 mm to reduce the distortion of the transducer 112. In some embodiments, in order to further reduce the distortion of the transducer 112, the difference between the two amplitudes of the diaphragm 1121 vibrating in two opposite directions (i.e., vibrating upwards and downwards) may be less than 0.04 mm. In some embodiments, in order to further reduce the distortion of the transducer 112, the difference between the two amplitudes of the diaphragm 1121 vibrating in two opposite directions (i.e., vibrating upwards and downwards) may be less than 0.03 mm.

As shown in FIG. 8 and FIG. 9, in some embodiments, the bracket 1123 may be arranged around the magnetic circuit component 1125. As shown in FIG. 9, along the vibration direction of the diaphragm, the bracket 1123 may include the first part 112311, a second part 11232, and a third part 11233. The first part 112311 refers to a part along the vibration direction of the diaphragm 1121, from a highest point D of a region connecting the bracket 1123 and the diaphragm 1121 to the highest point of a region connecting the bracket 1123 and the accommodation member 11253. The second part 11232 refers to a region on the bracket 1123 where the air hole is opened. As shown in FIG. 9, the second part 11232 refers to a part along the vibration direction of the diaphragm 1121, from the highest point of the region connecting the bracket 1123 and the accommodation member 11253 to a side wall (i.e., side towards the bottom 11253*a* of the accommodating member 11253) where a bottom of the air hole on the bracket 1123 is located. The third part 11233 refers to a part between a side wall where the bottom of the air hole on the bracket 1123 is located and the bottom of the bracket 1123 near the magnetic circuit component 1125 (i.e., the bottom 11253*a* near the accommodation member 11253). As shown in FIG. 10, a second connecting section 11212*b* is provided at one end of the folded-ring region 11212 away from the main-body region 11211 for connecting the bracket 1123. The second connecting section 11212*b* may be arranged parallel to the short axis direction Z and perpendicular to the vibration direction of the diaphragm. In some embodiments, the first part 112311 of the bracket 1123 may be connected to the second connecting section 11212*b* of the folded-ring region 11212. In some embodiments, the second connecting section 11212*b* of the folded-ring region 11212 may be connected to the first part 112311 of the bracket 1123 via a fixed ring 1155 to achieve a fixation of the diaphragm 1121 and the bracket 1123.

Figure 13:
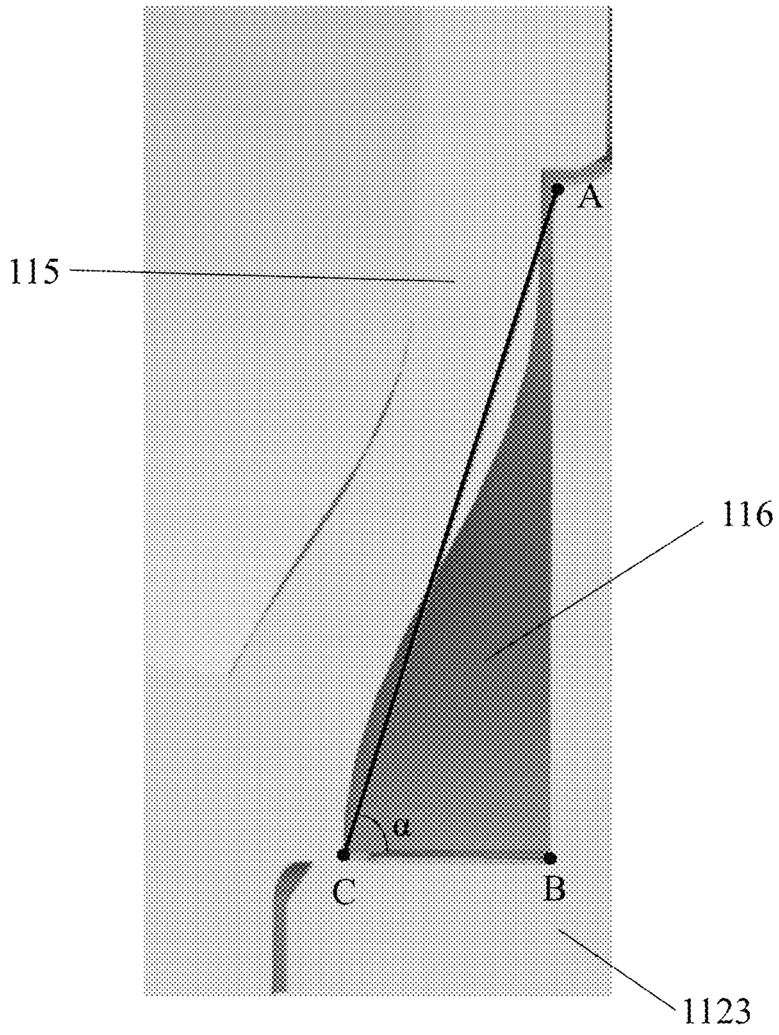
FIG. 13 is a schematic diagram illustrating a structure of a rear cavity according to some embodiments of the present disclosure.

FIG. 13 is a schematic diagram illustrating a structure of a rear cavity according to some embodiments of the present disclosure. As shown in FIG. 6 and FIG. 13, in some embodiments, a connecting frame 115 may be arranged inside the housing 111, and a second acoustic cavity may be formed between the connecting frame 115 and the bracket 1123 of the transducer 112, which may serve as the rear cavity 116. The rear cavity 116 may be separated from other structures (e.g., a main control circuit board, etc.) inside the housing 111, which is beneficial for improving the acoustic performance of the speaker 11. The housing 111 may be provided with at least one pressure relief hole (e.g., a first pressure relief hole 111*c* and/or a second pressure relief hole 111*d*), and the connecting frame 115 may be provided with an acoustic channel 1151 connecting the at least one pressure relief hole and the rear cavity 116 to facilitate the communication between the rear cavity 116 and the external environment, that is, air may freely enter and exit the rear cavity 116, thereby reducing the resistance of the diaphragm 1121 of the transducer 112 during the vibration process.

In some embodiments, a cross-section of the rear cavity 116 may be composed of two vertical edges and a curved edge, when two endpoints of the curved edge are connected by a straight line, the cross-section (e.g., a cross-section ABC) may be designated as a triangle. The inclined edge AC is a connecting line between two endpoints formed by a curved surface on the connecting frame 115 contacting two straight edges of the bracket 1123. In some embodiments, a thickness $h_4$ of the first part 112311 of the bracket 1123 along the vibration direction of the diaphragm 1121 may affect a volume of the rear cavity 116. When the thickness $h_4$ of the first part 112311 increases, and the volume of the speaker 11 remains unchanged, the volume of the rear cavity 116 decreases. Correspondingly, when the thickness $h_4$ of the first part 112311 decreases, and the volume of the rear cavity 116 increases. In some embodiments, the thickness of the first part 112311 of the bracket 1123 may affect the volume of the rear cavity 116, thereby affecting a resonance frequency of the rear cavity 116. In some embodiments, the rear cavity 116 refers to a cavity formed behind the diaphragm. At this time, when the thickness $h_4$ of the first part 112311 of the bracket 1123 increases, the volume of the rear cavity 116 may increase while the volume of the speaker 11 remains unchanged. Correspondingly, when the thickness $h_4$ of the first part 112311 decreases, the volume of the rear cavity 116 may decrease.

In some embodiments, a combination of the rear cavity 116 and the at least one pressure relief hole (e.g., the first pressure relief hole 111*c* and/or the second pressure relief hole 111*d*) arranged on the housing 111 may be designated as a Helmholtz resonance cavity model. The rear cavity 116 may be designated as a cavity of the Helmholtz resonance cavity model, and the at least one pressure relief hole may be designated as a neck of the Helmholtz resonance cavity model. At this time, a resonance frequency of the Helmholtz resonance cavity model is a resonant frequency $f_2$ of the rear cavity 116. In the Helmholtz resonance cavity model, a volume of the cavity (e.g., the rear cavity 116) may affect the resonance frequency f of the cavity (e.g., the rear cavity 116). The specific relationship is shown in formula (1):

$$f = \frac{c}{2\pi}\sqrt{\frac{S}{VL}} \tag{1}$$

Where c represents a speed of sound, S represents an area of a cross-section of the neck (e.g., the pressure relief hole), V represents a volume of the cavity (e.g., the rear cavity 116), and L represents a depth of the neck (e.g., the pressure relief hole).

According to formula (1), when the area of the cross-section of the pressure relief hole (e.g., the first pressure relief hole 111*c* and/or the second pressure relief hole 111*d*), and the depth L of the pressure relief hole remains unchanged, the volume of the rear cavity 116 increases, and the resonance frequency $f_2$ of the rear cavity 116 decreases, and moves towards a low frequency.

Figure 14:
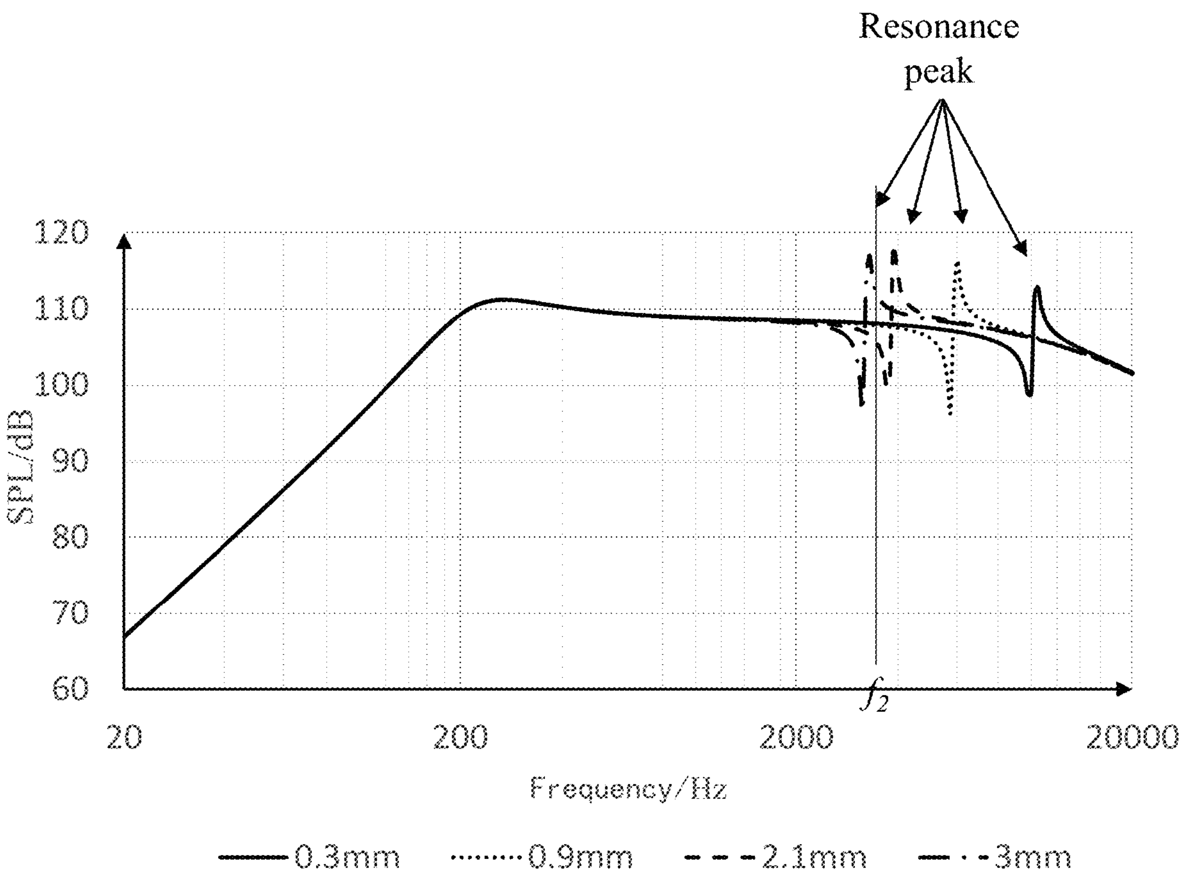
FIG. 14 is a schematic diagram illustrating a frequency response curve of rear cavities corresponding to different thicknesses of first parts according to some embodiments of the present disclosure.

FIG. 14 is a schematic diagram illustrating a frequency response curve of rear cavities corresponding to different thicknesses of first parts according to some embodiments of the present disclosure. As shown in FIG. 14, since the thickness $h_4$ of the first part 112311 of the bracket 1123 gradually increases from 0.3 mm to 3 mm, the volume of the rear cavity 116 gradually increases, and the resonance peak of the rear cavity 116 gradually moves towards the low frequency, reducing a flat range of the frequency response curve and affecting the output performance of the speaker 11.

If the thickness $h_4$ of the first part 112311 is too small, the amplitude of the diaphragm 1121 may be limited by the bracket 1123. If the thickness $h_4$ of the first part 112311 is too large, a size of the speaker 11 may be too large, thus causing the resonance peak of the rear cavity 116 to shift towards the low frequency, reducing the flat range of the frequency response curve of the rear cavity 116, affecting the sound quality of the speaker 11. The thickness of the first part 112311 refers to a minimum distance between a connection region of the bracket 1123 and the folded-ring region 11212 and an attaching region of the bracket directly attaching to the magnetic circuit component 1125 in a vibration direction of the diaphragm.

In some embodiments, in order to achieve a high low-frequency output of the speaker 11 and a wide range of flat range in the frequency response curve of the rear cavity 116, the thickness $h_4$ of the first part 112311 of the bracket 1123 may be within a range of 0.3 mm-3 mm. In some embodiments, in order to further enhance the low-frequency output of the transducer 112, the thickness $h_4$ of the first part 112311 of the bracket 1123 may be within a range of 0.5 mm-2 mm. In some embodiments, in order to further increase the flat area of the frequency response curve of the rear cavity 116, the thickness $h_4$ of the first part 112311 of the bracket 1123 may be within a range of 0.8 mm-1 mm. In some embodiments, the thickness $h_4$ of the first part 112311 of the bracket 1123 may be 0.9 mm, and the resonance peak of the rear cavity 116 may be around 6.1 kHz, and at this time, the speaker 11 may have a good low-frequency output, and the frequency response curve of the rear cavity 116 may have a wide flat range.

In some embodiments, the weight of transducer 112 may be mainly related to the bracket 1123 and the magnetic circuit component 1125, with magnetic circuit component 1125 accounting for a relatively large weight. In some embodiments, when the weight of bracket 1123 increases, while the material of bracket 1123 remains unchanged, a size of bracket 1123 may increase, and an area of the diaphragm 1121 may increase correspondingly. In some embodiments, the increase in the weight of the magnetic circuit assembly 1125 may increase a magnetic flux density near the coil 1122 and a driving force on the coil, thus making the amplitude of the vibration of the diaphragm 1121 great, and making the transducer 112 have a good sensitivity and a good low-frequency effect. However, if the weight of the transducer 112 is too large, the weight of the speaker 11 may be too large, affecting the stability and comfort of the open headphone 10.

Taking into account the two wearing situations where at least a portion of the speaker 11 shown in FIG. 3 covers the anthelix and the overall or a portion of the speaker 11 extends into the cavity of auricular concha as shown in FIG. 4, an audible volume of the ear 100 may increase (equivalent to higher sound production efficiency). Therefore, the weight of the transducer 112 may be reduced by reducing the size of the diaphragm 1121 or the weight of the magnetic circuit component 1125, thus providing the high sensitivity and the low-frequency output of the transducer 112, while making the open headphone 10 have the high wearing stability and comfort. In some embodiments, the weight of transducer 112 may be within a range of 1.1 g-3.3 g. In some embodiments, in order to further improve the sensitivity and low-frequency output of the transducer 112, the weight of transducer 112 may be within a range of 1.5 g-3 g. In some embodiments, in order to further improve the wearing stability and comfort of the open headphone 10, the weight of transducer 112 may be within a range of 2 g-2.5 g. In some embodiments, the weight of transducer 112 may be 2.2 g.

Figure 15:
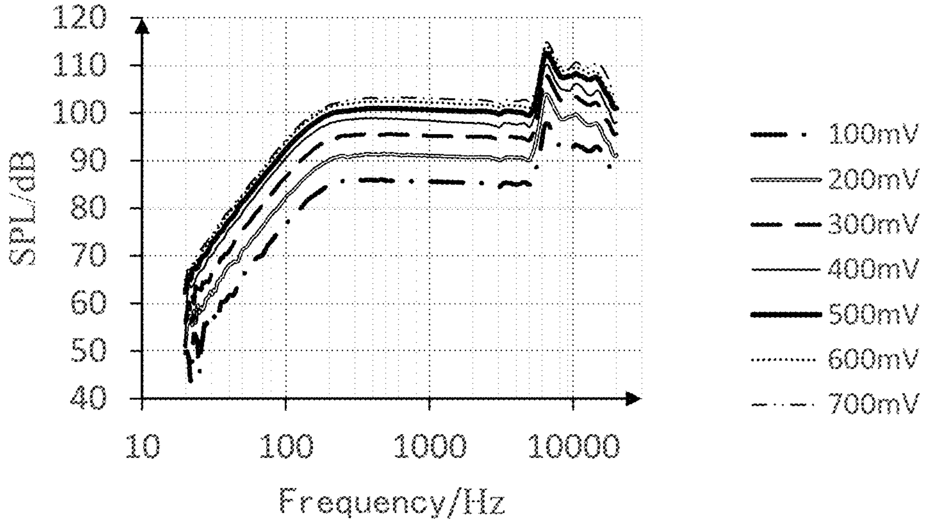
FIG. 15 is a schematic diagram illustrating a frequency response curve of a speaker under different driving voltages according to some embodiments of the present disclosure.

FIG. 15 is a schematic diagram illustrating a frequency response curve of a speaker under different driving voltages according to some embodiments of the present disclosure. If placing a diaphragm surface of speaker 11 facing a test microphone with a distance of 4 mm, applying a voltage within a range of 0.1V-0.7V to speaker 11, and setting a test frequency range within 20 Hz-2000 Hz, a frequency response curve (as shown in FIG. 15) of speaker 11 under different driving voltages may be obtained. In combination of FIG. 12 and FIG. 15, the amplitude of diaphragm 1121 may be within a range of 0 mm-0.8 mm when the input voltage is within a range of 0.1V-0.7V and the frequency is within a range of 20 Hz-6.1 kHz. At this point, in order to prevent the vibration of coil 1122 from contacting the bottom 11253*a* of the accommodation member, a distance $h_3$ (as shown in FIG. 9) between the bottom of coil 1122 and the bottom 11253*a* of the accommodation member may be greater than 0.8 mm. In some embodiments, in order to reduce the size of the speaker 11 and improve user comfort during wearing, the distance $h_3$ (as shown in FIG. 9) between the bottom of the coil 1122 and the bottom of the accommodation member 11253*a* may not exceed 0.9 mm. Therefore, with an input voltage of 0.1 V-0.7V and a frequency within a range of 20 Hz-6.1 kHz, the distance $h_3$ (as shown in FIG. 9) between the bottom of the coil 1122 and the bottom of the accommodation member 11253*a* may be within a range of 0.8 mm-0.9 mm.

As shown in FIG. 15, since the input voltage gradually increases from 100 mV to 700 mV, the output of the speaker 11 may gradually increase, and the sensitivity may also gradually increase. However, a frequency of the resonance peak may remain basically unchanged, which may be located near 6.1 kHz. Taking into account the two wearing situations where at least a portion of the speaker 11 shown in FIG. 3 covers the anthelix and the overall or a portion of the speaker 11 extends into the cavity of auricular concha as shown in FIG. 4, by controlling the distance $h_3$ (as shown in FIG. 9) between the bottom of the coil 1122 and the bottom of the accommodation member 11253*a* within a range of 0.8 mm-0.9 mm, the sensitivity of the speaker 11 may be relatively high. As shown in FIG. 15, when the input voltage is within a range of 100 mV-700 mV, a sound pressure level (SPL) of the speaker 11 may be within a range of 85 dB-103 dB at a frequency of 1 kHz.

In some embodiments, as described above, the thickness $h_4$ of the first part 112311 of bracket 1123 may be within a range of 0.3 mm-3 mm. When the thickness $h_4$ of the first part 112311 increases to 3 mm, the resonance frequency $f_2$ of the rear cavity 116 may decrease to 3.3 kHz, thus reducing the flat range and affecting the sound quality. In some embodiments, in order to increase the flat range and improve the sound quality of the speaker 11, the thickness $h_4$ of the first part 112311 may be less than 3 mm, and the resonance frequency $f_2$ of the rear cavity 116 may be no less than 3.3 kHz. In some embodiments, in order to further improve the sound quality of the speaker 11, the resonance frequency $f_2$ of the rear cavity 116 may be no less than 3.5 kHz. In some embodiments, in order to further improve the sound quality of the speaker 11, the resonance frequency $f_2$ of the rear cavity 116 may be no less than 4 kHz. In some embodiments, in order to further improve the sound quality of the speaker 11, the resonance frequency $f_2$ of the rear cavity 116 may be no less than 6 kHz.

In some embodiments, according to formula (1), the volume of the rear cavity 116 may affect the resonance frequency $f_2$ of the rear cavity 116. And the volume of the rear cavity 116 may be affected by the thickness $h_4$ of the first part 112311 of the bracket 1123. A range of the volume of the rear cavity 116 may be determined by a range of the thickness $h_4$ of the first part 112311 and the resonance frequency $f_2$ of the rear cavity 116. In some embodiments, the volume of the rear cavity 116 may be within a range of 60 $mm^3$-110 $mm^3$.

Figure 16:
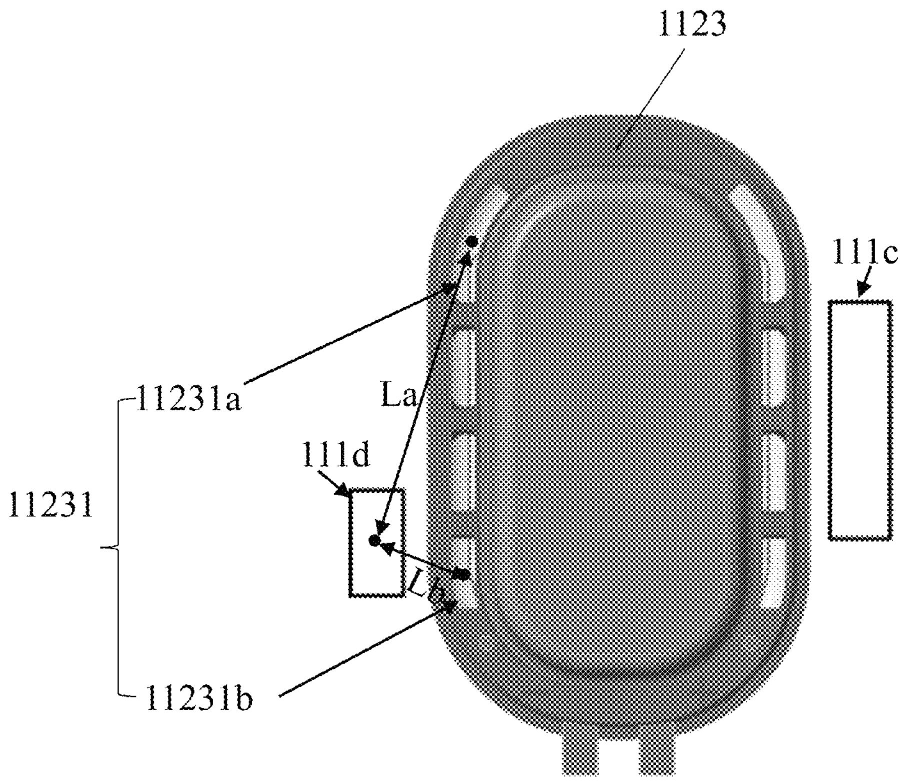
FIG. 16 is a schematic diagram illustrating positions of a bracket, a first pressure relief hole, and a second pressure relief hole according to some embodiments of the present disclosure.

FIG. 16 is a schematic diagram illustrating positions of a bracket, a first pressure relief hole, and a second pressure relief hole according to some embodiments of the present disclosure. As shown in FIG. 16, in some embodiments, the bracket 1123 may be provided with a plurality of air holes 11231. The arrangement of the plurality of air holes 11231 may allow sound on a back surface of the diaphragm 1121 to be transmitted to the rear cavity 116 and the at least one pressure relief hole based on the plurality of air holes 11231, thus providing a good channel for radiating sound on both sides of the diaphragm 1121.

In some embodiments, in order to better balance an airflow and balance an air pressure in the rear cavity 116, the plurality of air holes 11231 may be arranged asymmetrically. For example, with a short axis of the bracket 1123 as a center, the plurality of air holes 11231 may be arranged asymmetrically. Specifically, the bracket 1123 may be provided with a first air hoe 11231*a* and a second air hole 11231*b*. As shown in FIG. 16, a distance La from a center of the first air hole 11231*a* to a center of the second pressure relief hole 111*d* may be greater than a distance Lb from a center of the second air hole 11231*b* to a center of the second pressure relief hole 111*d*. In some embodiments, the air pressure in a position farther than a position of the second pressure relief hole 111*d* in the rear cavity 116 may be relatively high. Therefore, in order to balance the air pressure in the rear cavity 116, an area of the first air hole 11231*a* may be greater than an area of the second air hole 11231*b*. That is, in order to balance the air pressure inside the rear cavity 116, an area of an air hole closer to the second relief hole 111*d* (or the first relief hole 111*c*) may be smaller, and an area of an air hole farther away from the second relief hole 111*d* (or first relief hole 111*c*) may be greater. The distance from the air hole 11231 to the pressure relief hole refers to a distance between a center of the air hole 11231 and a center of a pressure relief hole. The center of the air hole or the pressure relief hole in the present disclosure refers to a centroid of a porous structure.

In the rear cavity 116, the air pressure in a position farther than a position of the first pressure relief hole 111*c* and/or the second pressure relief hole 111*d* in the rear cavity 116 may be relatively high, so the area of the air hole 11231 may be greater. With a position closer to the first relief hole 111*c* and/or the second relief hole 111*d*, the air pressure may lower, so the area of the air hole 11231 may be less. If the area of the plurality of air holes 11231 is the same, the position far from the first pressure relief hole 111*c* and/or the second pressure relief hole 111*d* in the rear cavity 116 may result in higher air pressure. Due to the small area of the plurality of air holes 11231, the air pressure in the rear cavity 116 cannot be well balanced, which may cause a great air resistance to the vibration of the diaphragm 1121. Similarly, in the position near the first relief hole 111*c* and/or the second relief hole 111*d* in the rear cavity 116, the diaphragm 1121 may be applied less resistance during vibration. As a result, the force on diaphragm 1121 is uneven, making the vibration of diaphragm 1121 unstable. Therefore, by adjusting the area of the plurality of air holes 11231, the low-frequency vibration of the speaker 11 may be smooth.

In some embodiments, due to the fact that the air hole 11231 may balance the air pressure in the rear cavity 116, the uniformity of the air resistance experienced by the diaphragm 1121 during vibration may be affected. Therefore, a total area of the plurality of air holes 11231 may affect the output performance of the speaker 11. A ratio of the total area of the plurality of air holes 11231 to an area of a projection of the diaphragm 1121 in a vibration direction of the diaphragm may affect the air resistance of the diaphragm 1121 during vibration. If the ratio of the total area of the plurality of air holes 11231 to the area of the projection of the diaphragm 1121 in a vibration direction of the diaphragm is too small, the air pressure in the rear cavity 116 may be high, and the diaphragm 1121 may experience greater air resistance during vibration, thus affecting the low-frequency output performance of the diaphragm 1121. If the ratio of the total area of the plurality of air holes 11231 to the area of the projection of the diaphragm 1121 in a vibration direction of the diaphragm reaches a certain threshold, increasing the ratio may weaken an influence of the air in the rear cavity 116 on the vibration of the diaphragm 1121, and also affect a structural strength of the bracket. Therefore, in some embodiments, in order to make the diaphragm 1121 to be experienced a uniform and small air resistance during vibration, and ensure the good output performance of the speaker 11, the ratio of the total area of the plurality of air holes 11231 to the area of the projection of the diaphragm 1121 in a vibration direction of the diaphragm may be in a range of 0.008-0.3. In some embodiments, in order to further reduce the air resistance experienced by the diaphragm 1121 during vibration, the ratio of the total area of the plurality of air holes 11231 to the area of the projection of the diaphragm 1121 in a vibration direction of the diaphragm may be in a range of 0.1 to 0.25. In some embodiments, in order to further reduce the air resistance experienced by the diaphragm 1121 during vibration, the ratio of the total area of the plurality of air holes 11231 to the area of the projection of the diaphragm 1121 in a vibration direction of the diaphragm may be in a range of 0.11 to 0.23.

Figure 17:
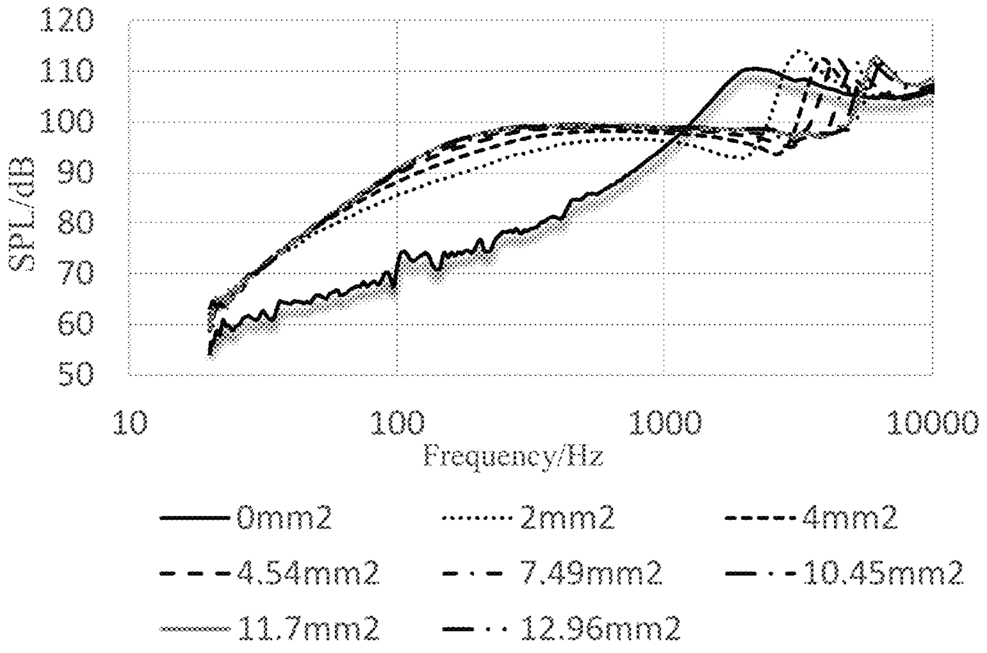
FIG. 17 is a schematic diagram illustrating a frequency response curve of rear cavities corresponding to different total areas of a plurality of air holes according to some embodiments of the present disclosure.

FIG. 17 is a schematic diagram illustrating a frequency response curve of rear cavities corresponding to different total areas of a plurality of air holes according to some embodiments of the present disclosure. The different total areas of the plurality of air holes 11231 may be achieved by using plasticine to block a portion of the plurality of air holes 11231. Placing the diaphragm of speaker 112 facing the test microphone with a distance of 4 mm, applying a voltage of 0.4V to speaker 11, and setting a test frequency range within 20 Hz-2000 Hz, the frequency response curve (as shown in FIG. 17) of speaker 112 under different total areas of a plurality of air holes may be obtained. 0 $mm^2$ refers to that the plurality of air holes 11231 are completely blocked. That is, there are no holes on the bracket. As shown in FIG. 17, as the total area of the plurality of air holes 11231 gradually increases from 0 $mm^2$ to 4.54 $mm^2$, the frequency response curve of the rear cavity 116 may gradually move up in the low-frequency region (e.g., 100 Hz to 1000 Hz), indicating that the low-frequency response of the rear cavity 116 may gradually increase. When the total area of the plurality of air holes 11231 gradually increases from 4.54 $mm^2$ to 12.96 $mm^2$, the low-frequency response of the rear cavity 116 may not change significantly, because when the total area of the plurality of air holes 11231 increases to a certain value (e.g., 4.54 $mm^2$), the influence of the air in the rear cavity 116 on the vibration of the diaphragm 1121 may gradually weaken under the low-frequency vibration. Therefore, even if the total area of the plurality of air holes 11231 still increases, the effect on the frequency response curve of the low-frequency region of the rear cavity 116 may not be significant.

As shown in FIG. 17, as the total area of the plurality of air holes 11231 gradually increases from 0 $mm^2$ to 12.96 $mm^2$, the resonance peak of the rear cavity 116 may gradually shift towards high frequency, and the frequency response curve in the low frequency region (e.g., 100 Hz-1000 Hz) may gradually flatten. In some embodiments, in order to achieve the good low-frequency response in the rear cavity 116, the total area of the plurality of air holes 11231 may be in a range of 4.54 $mm^2$-12.96 $mm^2$. In some embodiments, in order to achieve the good low-frequency response in the rear cavity 116, the total area of the plurality of air holes 11231 may be in a range of 5 $mm^2$ to 11 $mm^2$. In some embodiments, in order to achieve the good low-frequency response in the rear cavity 116, the total area of the plurality of air holes 11231 may be in a range of 7 $mm^2$-10 $mm^2$. In some embodiments, in order to achieve good low-frequency response in the rear cavity 116, the total area of the plurality of air holes 11231 may be in a range of 8 $mm^2$-10 $mm^2$.

In some embodiments, in order to improve the structural strength, the bracket 1123 may be provided with the plurality of air holes 11231, and a connecting part between the plurality of air holes 11231 may be provided a reinforcing rib. In some embodiments, in order to simplify the opening process while meeting a requirement of the total area of the plurality of air holes 11231, a count of the plurality of air holes 11231 may be one.

In some embodiments, the bottom 11253*a* or the side wall 11253*b* of the accommodation member 11253 of the magnetic circuit component 1125 may also have a plurality of air holes. The sound on the back surface of the diaphragm 1121 may be transmitted to the rear cavity 116 and the at least one pressure relief hole based on the plurality of air holes, which may provide a good channel for radiating sound on both sides of diaphragm 1121.

In some embodiments, the area of the projection of the diaphragm 1121 in the vibration direction of the diaphragm 1121 may affect an amount of air pushed by the diaphragm 1121 during vibration, thereby affecting the efficiency of the diaphragm 1121 in producing sound during vibration and affecting the acoustic output effect of the speaker 11. If the area of the projection of the diaphragm 1121 in the vibration direction of diaphragm 1121 is too small, less air may be pushed by the vibration of diaphragm 1121, and the acoustic output effect of the speaker 11 may be poor. If the area of the projection of the diaphragm 1121 in the vibration direction of diaphragm 1121 is too large, a size of the bracket 1123 may be too large, resulting in an increase in the weight of the bracket 1123, making the weight of the speaker 11 great, affecting the structure and weight of the speaker 11, and affecting wearing comfort and stability. Combining the two wearing situations where at least a portion of the speaker 11 shown in FIG. 3 covers the anthelix and the overall or a portion of the speaker 11 extends into the cavity of auricular concha as shown in FIG. 4, the audible volume of the ear 100 may increase (equivalent to the higher vocal efficiency), so the size of the diaphragm 1121 may not need to be too large. In some embodiments, the sound outlet hole 111*a* may be arranged on a side wall of the housing 111 of the speaker 11 close to the ear of the user, while the sound outlet hole 111*a* may be arranged on a front side of the diaphragm 1121 and connected with the front cavity 114. The vibration direction of the diaphragm 1121 may be or may approximately be equal to the thickness direction X of the speaker 11. The area of the projection of the diaphragm 1121 in the vibration direction may be or may approximately be equal to an area of a projection of the diaphragm 1121 in the sagittal plane. The area of the projection of the diaphragm 1121 in the vibration direction of the diaphragm 1121 may affect the area of the projection of the speaker 11 on the sagittal plane of the user. An overlap ratio of the area of the projection of the speaker 11 on the sagittal plane to an area of a projection of the cavity of the auricular concha of the user on the sagittal plane may affect the cavity-like structure formed by the speaker 11 extending into the cavity of the auricular concha, thus affecting the acoustic output effect of the speaker 11. Further, a size of a long axis and a size of a short axis of the diaphragm 1121 may affect a size of a long axis and a size of a short axis of the projection of the speaker 11 on the sagittal plane.

In some embodiments, considering the two wearing situations where at least a portion of the speaker 11 shown in FIG. 3 covers the anthelix and the overall or a portion of the speaker 11 extends into the cavity of auricular concha as shown in FIG. 4, in order to enable the speaker 11 to have a good acoustic output effect, and the area the projection of the speaker 11 on the sagittal plane or the thickness of the speaker 11 is appropriate, the area of the projection of diaphragm 1121 in the vibration direction of the diaphragm 1121 may be within a range of 90 $mm^2$-560 $mm^2$. Preferably, the area of the projection of diaphragm 1121 in the vibration direction of the diaphragm 1121 may be within a range of 120 $mm^2$-300 $mm^2$. Preferably, the area of the projection of diaphragm 1121 in the vibration direction of the diaphragm 1121 may be within a range of 150 $mm^2$-200 $mm^2$.

Considering the two wearing situations where at least a portion of the speaker 11 shown in FIG. 3 covers the anthelix and the overall or a portion of the speaker 11 extends into the cavity of auricular concha as shown in FIG. 4, in order to maximize the area of the diaphragm 1121 within a limited size of the speaker 11 and enhance the acoustic output performance of the speaker 11, in some embodiments, when the vibration direction of the diaphragm 1121 is parallel to the thickness direction X of the speaker 11, the ratio of the area of the projection of the diaphragm 1121 in the vibration direction of the diaphragm (i.e., the area of the projection of the diaphragm 1121 on the sagittal plane) to an area of a projection of the housing 111 in the vibration direction of the diaphragm (i.e., an area of a projection of the housing 111 on the sagittal plane) may not be less than 0.5. In some embodiments, in order to maximize the area of the diaphragm 1121 within the limited size of the speaker 11, thereby enhancing the acoustic output performance of the speaker 11, the ratio of the area of the projection of the diaphragm 1121 in the vibration direction of the diaphragm to an area of a projection of the housing 111 in the vibration direction of the diaphragm may not be less than 0.8. In some embodiments, in order to maximize the area of the diaphragm 1121 within the limited size of the speaker 11, thereby enhancing the acoustic output performance of the speaker 11, the ratio of the area of the projection of the diaphragm 1121 in the vibration direction of the diaphragm to an area of a projection of the housing 111 in the vibration direction of the diaphragm may be within a range of 0.8-0.95.

In some embodiments, combined with the wearing situation where at least a portion of the speaker 11 shown in FIG. 3 covers the anthelix, the size of the long axis of the diaphragm 1121 may be within a range of 13 mm-25 mm, and the size of the short axis of the diaphragm may be within a range of 4 mm-13 mm. In combination with the wearing situation where the overall or a portion of the speaker 11 extends into the cavity of auricular concha as shown in FIG. 4, in order to facilitate the overall or a portion of the speaker 11 extending into the cavity of auricular concha to form an effective cavity-like structure, the size of the short axis of the diaphragm 1121 may be within a range of 4 mm-13 mm. Based on the size of the short axis mentioned above, and based on the area of the projection of the diaphragm 1121 in the vibration direction of the diaphragm (e.g., the area of the projection of the diaphragm 1121 in the vibration direction being within a range of 52 $mm^2$-325 $mm^2$), the size of the long axis of the diaphragm 1121 may further be determined to be within a range of 13 mm-25 mm. For example, the size of the long axis of diaphragm 1121 may be within a range of 15 mm-20 mm, and the size of the short axis of the diaphragm may be within a range of 5 mm-10 mm. For example, the size of the long axis of the diaphragm 1121 may be within a range of 17 mm-18 mm, and the size of the short axis of the diaphragm may be within a range of 7 mm-8 mm.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "data block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A speaker, comprising:

a diaphragm;

a magnetic circuit component; and a coil connected to the diaphragm, at least part of the coil being arranged in a magnetic gap formed by the magnetic circuit component, and the coil driving the diaphragm to vibrate to generate sound after the coil being energized, wherein the diaphragm includes a main-body region and a folded-ring region surrounding the main-body region, the main-body region includes a first inclined section and a first connecting section connected to the coil, the first inclined section is attached to a portion of the folded-ring region, wherein the folded-ring region includes a second inclined section, and at least part of the second inclined section is attached to the first inclined section, and the first inclined section is tilted in a direction away from the coil with respect to the first connecting section.

2. The speaker of claim 1, wherein the second inclined section is arranged on a side of the first inclined section away from the coil.

3. The speaker of claim 1, wherein the folded-ring region includes an arc-shaped section, and a ratio of a height of the arc-shaped section to a span of the arc-shaped section is within a range of 0.35~0.4.

4. The speaker of claim 3, wherein the main-body region includes a dome arranged at an end of the first connecting section far from the first inclined section, and a span of the dome is within a range of 2 mm~8 mm, and a height of the dome is within a range of 0.7 mm~1.2 mm.

5. The speaker of claim 4, wherein a ratio of the height of the dome to the span of the dome is within a range of within a range of 0.1~0.3.

6. The speaker of claim 1, wherein an inclination angle of the first inclined section with respect to the first connecting section is within a range of 5°~30°, and the first connecting section is perpendicular to a vibration direction of the diaphragm.

7. The speaker of claim 1, wherein the magnetic circuit component includes an accommodation member, and a distance from a bottom of the coil to a bottom of the accommodation member is within a range of 0.8 mm~0.9 mm in a frequency range of 20 Hz~6.1 kHz under an input voltage within 0.1V~0.7V.

8. The speaker of claim 1, further comprising a bracket arranged around the magnetic circuit component, wherein a first part of the bracket is connected to a second connecting section of the folded-ring region.

9. The speaker of claim 8, wherein a thickness of the first part of the bracket connected to the folded-ring region is within a range of 0.3 mm~3 mm, and the thickness of the first part is a minimum distance between a connection region of the bracket and the folded-ring region and an attaching region of the bracket directly attaching to the magnetic circuit component in a vibration direction of the diaphragm.

10. The speaker of claim 8, further comprising a housing, wherein a pressure relief hole is provided on the housing, a plurality of air holes are provided on the bracket, sound from a back surface of the diaphragm is transmitted to the pressure relief hole via the plurality of air holes, the plurality of air holes at least include a first air hole and a second air hole, a distance from a center of the first air hole to a center of the pressure relief hole is greater than a distance from a center of the second air hole to the center of the pressure relief hole, and an area of the first air hole is greater than an area of the second air hole.

11. The speaker of claim 8, further comprising a housing, wherein a pressure relief hole is provided on the housing, a plurality of air holes are provided on the bracket, sound from a back surface of the diaphragm is transmitted to the pressure relief hole via the plurality of air holes, and a ratio of a total area of the plurality of air holes to an area of a projection of the diaphragm in a vibration direction of diaphragm is within a range of 0.008~0.3.

12. The speaker of claim 8, wherein a plurality of air holes are provided on a bottom wall of an accommodation member of the magnetic circuit component or a side wall of the magnetic circuit component that is attached to the bracket.

13. The speaker of claim 1, further comprising a housing, wherein a ratio of an area of a projection of the diaphragm in a vibration direction of diaphragm to an area of a projection of the housing in the vibration direction of diaphragm is not less than 0.5.

14. The speaker of claim 13, wherein the ratio of the area of the projection of the diaphragm in the vibration direction of diaphragm to the area of the projection of the housing in the vibration direction of diaphragm is within a range of 0.8~0.95.

15. The speaker of claim 13, wherein a size of a long axis of the diaphragm is within a range of 13 mm~25 mm, and a size of a short axis of the diaphragm is within a range of 4 mm~13 mm.

16. The speaker of claim 1, wherein a minimum distance between the coil and the first inclined section is not less than 0.3 mm.

17. The speaker of claim 1, wherein the magnetic circuit component includes a magnetic conductive plate and a magnet, wherein the magnetic conductive plate is arranged between the magnet and the diaphragm and is attached to a surface of the magnet, and a distance between a center of the coil and a center of the magnetic conductive plate is less than 0.3 mm in a vibration direction of the diaphragm.

18. The speaker of claim 17, wherein a distance from a lowest point of the dome to an upper surface of the magnetic conductive plate is greater than 0.8 mm in a vibration direction of the diaphragm.

19. The speaker of claim 1, wherein the magnetic circuit component includes an accommodation member, and a distance between a bottom wall of the coil and a bottom of the accommodation member is within a range of 0.2 mm~4 mm in a vibration direction of the diaphragm.

* * * * *